US012767374B2

(12) United States Patent
Bonardi

(10) Patent No.: US 12,767,374 B2
(45) Date of Patent: Oct. 20, 2026

(54) MACHINE FOR APPLYING SAFETY STRIPS TO THE UPPER PART OF CONTAINERS

(71) Applicant: P.E. LABELLERS S.P.A., Porto Mantovano (IT)

(72) Inventor: Luca Bonardi, San Giorgio Bigarello (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 53 days.

(21) Appl. No.: 18/730,958

(22) PCT Filed: Sep. 9, 2022

(86) PCT No.: PCT/EP2022/075165
§ 371 (c)(1),
(2) Date: Jul. 22, 2024

(87) PCT Pub. No.: WO2023/147897
PCT Pub. Date: Aug. 10, 2023

(65) Prior Publication Data
US 2025/0229933 A1 Jul. 17, 2025

(30) Foreign Application Priority Data
Feb. 1, 2022 (IT) ........................ 102022000001625

(51) Int. Cl.
*B65C 3/18* (2006.01)
*B65C 9/42* (2006.01)

(52) U.S. Cl.
CPC . *B65C 3/18* (2013.01); *B65C 9/42* (2013.01)

(58) Field of Classification Search
None
See application file for complete search history.

(56) References Cited

U.S. PATENT DOCUMENTS 4,172,753 A 10/1979 Benoit
5,174,851 A 12/1992 Zodrow et al.

FOREIGN PATENT DOCUMENTS

DE 4013983 A1 11/1991
DE 102004056343 A1 5/2006
GB 2 086 344 A 5/1982

OTHER PUBLICATIONS

DE 102004056343A1 machine translation (Year: 2004).*
(Continued)

*Primary Examiner* — Barbara J Musser
(74) *Attorney, Agent, or Firm* — THOMPSON HINE LLP

(57) ABSTRACT

A machine for applying safety strips to the upper part of containers, includes, along an advancement path of the containers, at least one application station provided with at least one application assembly provided with at least one crimping device which includes a first pad and a second pad. The second paid is functionally connected to a cam-based actuation device which is shaped to impart in sequence to the second pad at least one first oscillation movement and at least one second oscillation movement. The machine also includes a system for detecting the transfer by a transfer station of the safety strips onto the containers and a system for varying the shape of the cam-based actuation device which can be activated on command upon the detection of the lack of transfer of the safety strip to at least one corresponding container.

6 Claims, 22 Drawing Sheets

(56) References Cited

OTHER PUBLICATIONS

European Patent Office, International Search Report and Written Opinion issued Dec. 22, 2022, which pertains to PCT Application No. PCT/EP2022/075165. 8 pgs.

* cited by examiner 1
10
17
32
18
19
33
28
24
25
20
65
26a
21a
34
36
46
12
58
41
13b
14
13
100
13b
5
3b
3a
7
4b
4
4a
3
11a
22
23
2
11
9
11a
11a
8
8
10a
8a
8a
6
8a
8a
8a

MACHINE FOR APPLYING SAFETY STRIPS TO THE UPPER PART OF CONTAINERS

The present invention relates to a machine for applying safety strips to the upper part of containers.

As is known, safety or warranty strips are usually applied on the top part of containers, such as for example bottles for alcoholic beverages or jars for food products, and in particular on their closure elements, such as stoppers, lids or the like, and have the function of ensuring the integrity of the contents of the container by indicating, through their breakage, a prior opening or tampering of said container.

These safety strips are typically glued to the container by arranging them so as to straddle to the closure element of the container, so that they adhere with their ends to opposite lateral portions of the container and with their intermediate part to the closure element of the container.

Machines that allow to apply automatically the safety strips to the containers are known which generally comprise a conveyor that allows to move the containers along an advancement path.

Furthermore, these machines have in mutual sequence, along the advancement path of the containers, a transfer station, which transfers to the individual containers in transit on the conveyor a respective safety strip, previously provided with glue, making one end of the safety strip adhere to a lateral portion of the container arranged at the top of said container, and an application station, in which the other end of the safety strip is made to adhere to the opposite lateral portion of the container, so as to arrange the safety strip astride the closure element of the container.

In particular, machines of this type are known in which the container conveyor comprises a rotating carousel which is provided at its peripheral region with plates for supporting the individual containers and, above each plate, respective retention heads, designed to contact the closure element of the containers, in order to keep the containers resting on the corresponding plates.

In machines of this type, the transfer station is arranged at the peripheral region of the carousel and is provided with a transfer element constituted typically by a transfer drum, which allows to pick up the safety strips from a magazine and to transfer to the containers the safety strips, which are arranged so as to be spread flat with their axis of extension oriented substantially parallel to the axis of the containers, so that the safety strips can adhere, with a first one of their ends, arranged in a lower region, to a first lateral portion of the corresponding container that is proximate to the closure element of the container and, with a second one of their ends, which is opposite to the first end and arranged in an upper region, to the retention head that engages the corresponding container.

The application station has, in turn, a supporting structure on which at least one application assembly is mounted which can move, with respect to the supporting structure, substantially parallel to a portion of the advancement path of the containers and substantially at the same speed as said containers, so as to be able to follow a respective container along the portion of its advancement path.

Typically, the application station is arranged at an output star conveyor that picks up the containers that arrive from the carousel. In this case, each application assembly can move with a motion that is synchronized with the movement of the output star conveyor, so as to be able to follow the containers that are entrained by the output star conveyor.

In particular, for each receptacle of the output star conveyor there is a respective application assembly, so that each container that arrives from the carousel and is received by the output star conveyor can be taken by a respective application assembly.

Each application assembly is associated with the respective container at the region in which the container, still resting on the corresponding supporting plate of the carousel and engaged by the corresponding retention head, enters the corresponding receptacle of the output star conveyor and then follows it, at the same time completing thereon the application of the safety strip that the container has received form the transfer station, while the container travels along the portion of its advancement path that is defined by the output star conveyor and progressively makes the container leave the carousel in order to be transferred outside the machine.

In greater detail, each application assembly comprises a crimping device that allows to make the second end of the safety strip adhere to a second lateral portion of the container located on the side opposite to the first lateral portion of the container to which the first end of said safety strip already adheres.

Such crimping device comprises a pair of pads, which are each designed to engage a respective end of the sealing strip and are movable on command with respect to each other in order to move the second end of the safety strip to adhere to the second lateral portion of the container.

In particular, the crimping device comprises a first pad, which is designed to face, with a working face, the first lateral portion of the container and to engage the first end of the safety strip, so as to keep it pressed against the first lateral portion of the container, acting in cooperation with an abutment element, also comprised in the application assembly, which in turn is designed to be moved to engage against the side of the container that is opposite with respect to the one in which the first pad acts, so that the container is clamped between the first pad and the abutment element.

The crimping device comprises, moreover, a second pad, which is designed to engage, with a working face, the second end of the safety strip and is movable, with respect to the first pad, in order to entrain the second end of the safety strip so that it adheres to the second lateral portion of the container, while the first end of the safety strip is held against the first lateral portion of the container by the first pad.

In particular, the second pad has, on its working face, at least one first suction port in order to retain removably the second end of the safety strip on its working face and can oscillate, on command, with respect to the first pad, about a rotation axis, which is oriented substantially transversely to the advancement path of the containers, is eccentrically axially offset with respect to the longitudinal axis of the second pad and is spaced from the working face of the second pad, in the direction of the corresponding container, so as to allow the second pad to move the second end of the safety strip transferred onto the corresponding container to adhere to the second lateral portion of the container, following an oscillation movement thereof about the rotation axis.

More particularly, during the operation of the machine, the second pad can take at least two extreme positions which are mutually angularly spaced about its rotation axis, respectively at least one first position or waiting position, in which the second pad is arranged above the first pad and is arranged so that its working face is directed in the same direction as the working face of the first pad, so as to be able to face, with its working face, the retention head arranged on the container on which, in each instance, it is required to apply the second end of the safety strip, and at least one second position or application position, in which the second pad is rotated substantially through 180°, about its rotation axis, with respect to the first position, and its working face is directed toward the working face of the first pad, so that the second pad is located on the side of the corresponding container that is opposite with respect to the one where the first pad is located and its working face can face the second lateral portion of the container, so as to be able to thus transfer the second end of the safety strip onto the second lateral portion of the container.

During the path of the corresponding container on the output star conveyor, the second pad is actuated to perform oscillation movements, about its own rotation axis, which comprise at least one pick-up movement, which the second pad performs when the corresponding container is still engaged by the corresponding retention head on the carousel, in order to pick up the second end of the safety strip from the retention head of the respective container, and at least one application movement, which the second pad performs after the pick-up movement and after the corresponding container has left the carousel, being released from the corresponding retention head, in order to apply the second end of the safety strip to the second lateral portion of the corresponding container.

In particular, in the pick-up movement the second pad is actuated so as to perform a first rotation, about its own rotation axis, in the direction that allows the second pad to pass from the waiting position, in which it is when the corresponding container is received by the receptacle of the output star conveyor with which its application assembly is associated, to a pick-up position, arranged between the waiting position and the application position, in which the second pad is closer to the retention head of the corresponding container, so that the second end of the safety strip, which is applied to the retention head, contacts the working face of the second pad, so as to be retained on the working face of the second pad by virtue of the action of the suction port.

Subsequently, the second pad is actuated in order to perform a second rotation, performed in the opposite direction with respect to the first rotation, so as to pass from the pick-up position to the waiting position, so that the second end of the safety strip, remaining retained on the working face of the second pad, can be removed, by the second pad, from the retention head of the corresponding container, before said container leaves the carousel and is released from the engagement with the retention head.

After the corresponding container has left the carousel, the second pad is actuated in order to perform the application movement, which consists of a third rotation, performed by the second pad, through an angle of substantially 180°, in the same direction as the first rotation, so that the second pad, with the second end of the safety strip retained on its working face, can pass from the waiting position to the application position, so as to move the second end of the safety strip to adhere to the second lateral portion of the container.

Subsequently, after the deactivation of the suction port and an optional step in which the second pad is kept in the application position, the second pad is actuated so as to produce a fourth rotation, in the opposite direction with respect to the third rotation, about its own rotation axis, so as to return the second pad from the application position to the waiting position, so that it is ready to operate on another container arriving from the carousel.

The rotational actuation of the second pad to perform the pick-up movement and the application movement is provided by means of a cam-based actuation device formed on the lateral surface of a cylindrical drum, which is integral with the fixed structure of the application station and is arranged coaxially and above the output star conveyor.

In particular, each application assembly is moved around said cylindrical drum and the cam-based actuation device is functionally connected to the crimping device of each application assembly in order to impart the oscillation movements of the second pad, about its own rotation axis, in response to the movement of each application assembly about the cylindrical drum.

More particularly, the cam-based actuation device comprises a sliding guide which extends, along the outer lateral surface of the cylindrical drum, according to a preset shape and is provided by a slot delimited by two mutually overlapping and mutually facing tracks.

The sliding guide is designed to be traced, for each application assembly, by a follower roller, interposed between the two tracks and connected, by virtue of kinematic transmission means, to the respective second pad, so that in its path along the sliding guide the follower roller performs, following the shape of said sliding guide and of the tracks in particular, strokes between different heights that translate, by virtue of the kinematic transmission means, into oscillation movements of the second pad about its rotation axis.

In particular, the sliding guide has parking portions, which extend on a substantially horizontal plane, so that the follower roller, by traveling along said parking portions, does not perform strokes between different heights and consequently the second pad does not receive any movement from the kinematic transmission means, remaining therefore stationary in position with respect to the first pad.

The sliding guide has, moreover, movement portions, in which the shape of the sliding guide determines strokes of the follower roller between different heights, so as to produce the pick-up movement and the application movement of the second pad.

One drawback of the machines so structured occurs when the safety strips are depleted in the transfer station magazine.

In this case, when the containers pass through the transfer station, no safety strip is transferred onto the containers, and therefore said containers arrive at the application station without the safety strip applied on the corresponding retention head.

Consequently, when the second pad performs the pick-up movement on the container without the safety strip, there is the risk that the second pad might be soiled with the glue residues left on the retention head by the previous safety strips, with the possibility that said glue residues might be aspirated by the suction port of the second pad and might compromise the proper operation of the second pad on the subsequent incoming containers with a safety strip applied thereto, preventing the release of the safety strip onto the container, when the second pad performs the application movement.

The aim of the present invention is to provide a machine for applying safety strips to the upper part of containers that is capable of improving the background art in one or more of the aspects mentioned above.

Within this aim, an object of the invention is to provide a machine for applying safety strips to the upper part of containers that is capable of preventing the second pad of the application assemblies from being possibly soiled with glue if the safety strip on the corresponding container is not present.

Another object the invention is to provide a machine for applying safety strips to the upper part of containers that is extremely reliable in its operation.

A further object of the invention is to provide a machine for applying safety strips to the upper part of containers that has a relatively simple structure.

A further object of the present invention is to overcome the drawbacks of the background art in a manner that is alternative to any existing solutions.

Not least object of the invention is to provide a machine for applying safety strips to the upper part of containers that can be manufactured with low costs, so as to be competitive also from a purely economic standpoint.

This aim and these and other objects that will become better apparent hereinafter are achieved by a machine for applying safety strips to the upper part of containers according to claim 1, optionally provided with one or more of the characteristics of the dependent claims.

Further characteristics and advantages of the invention will become better apparent from the description of a preferred but not exclusive embodiment of the machine for applying safety strips to the upper part of containers according to the invention, illustrated by way of non-limiting example in the accompanying drawings, wherein.

Figure 3:
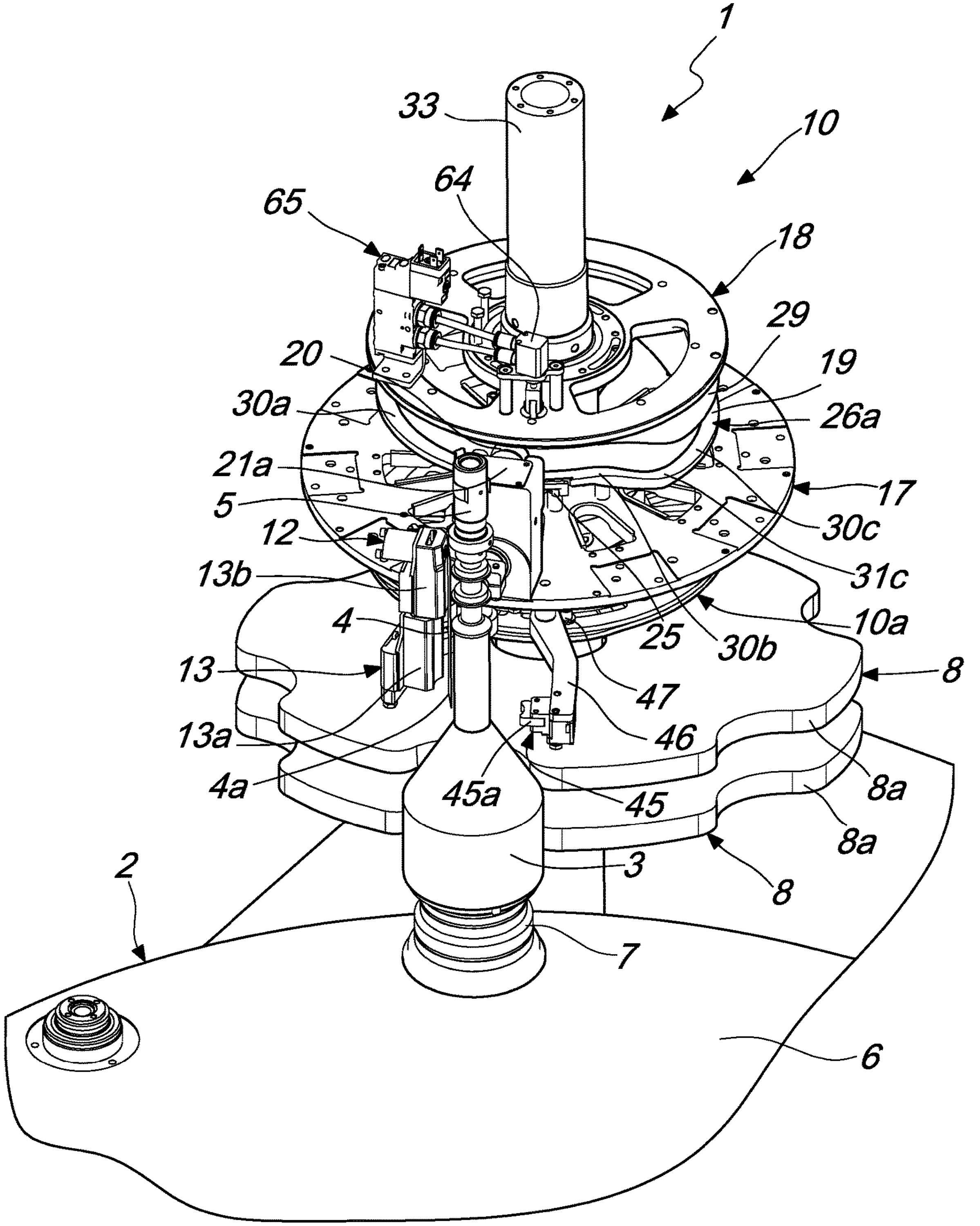
FIG. 3 is a perspective view of the application station wherein a container is taken by a respective application assembly.
Figure 3A:
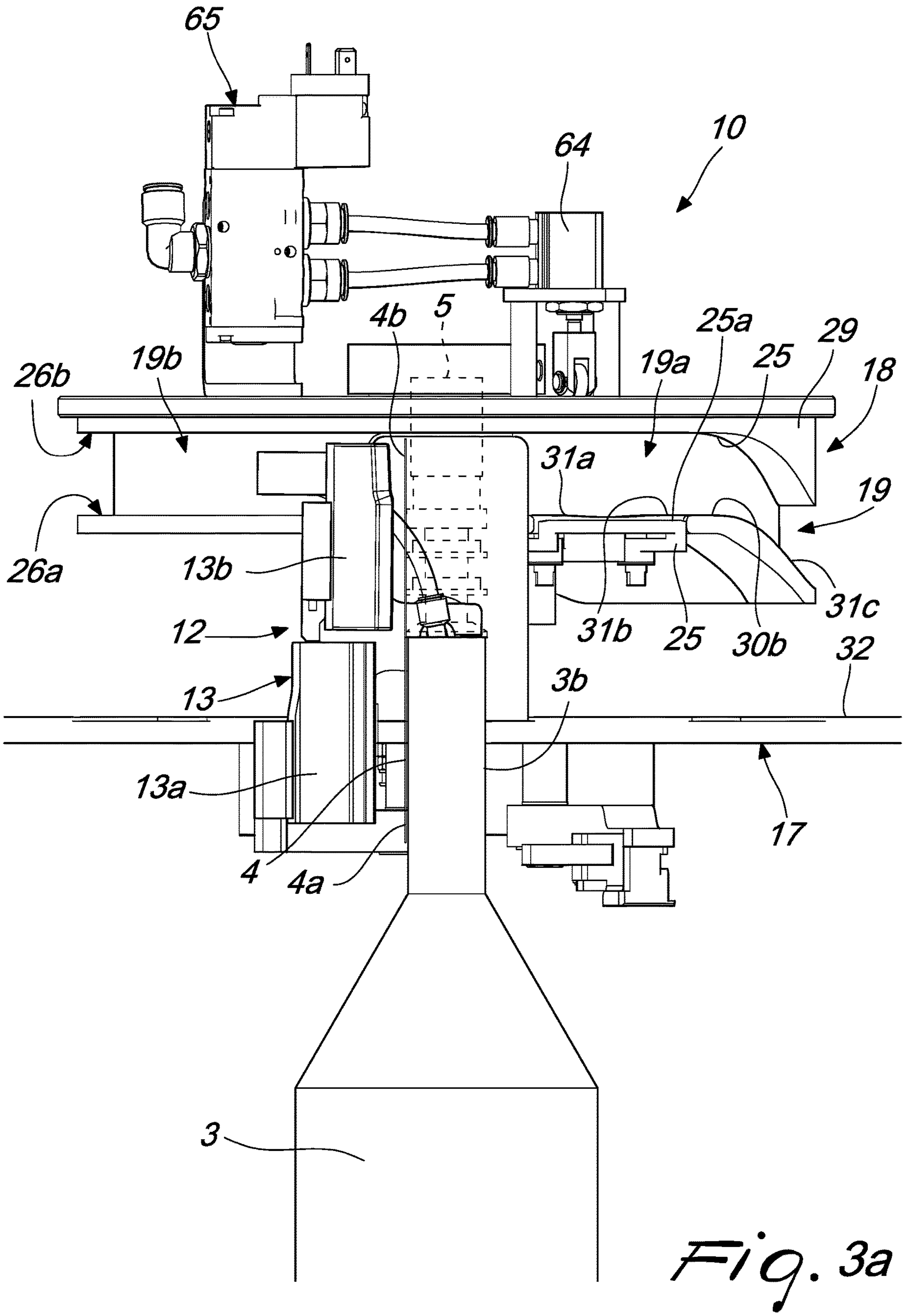
Figure 4:
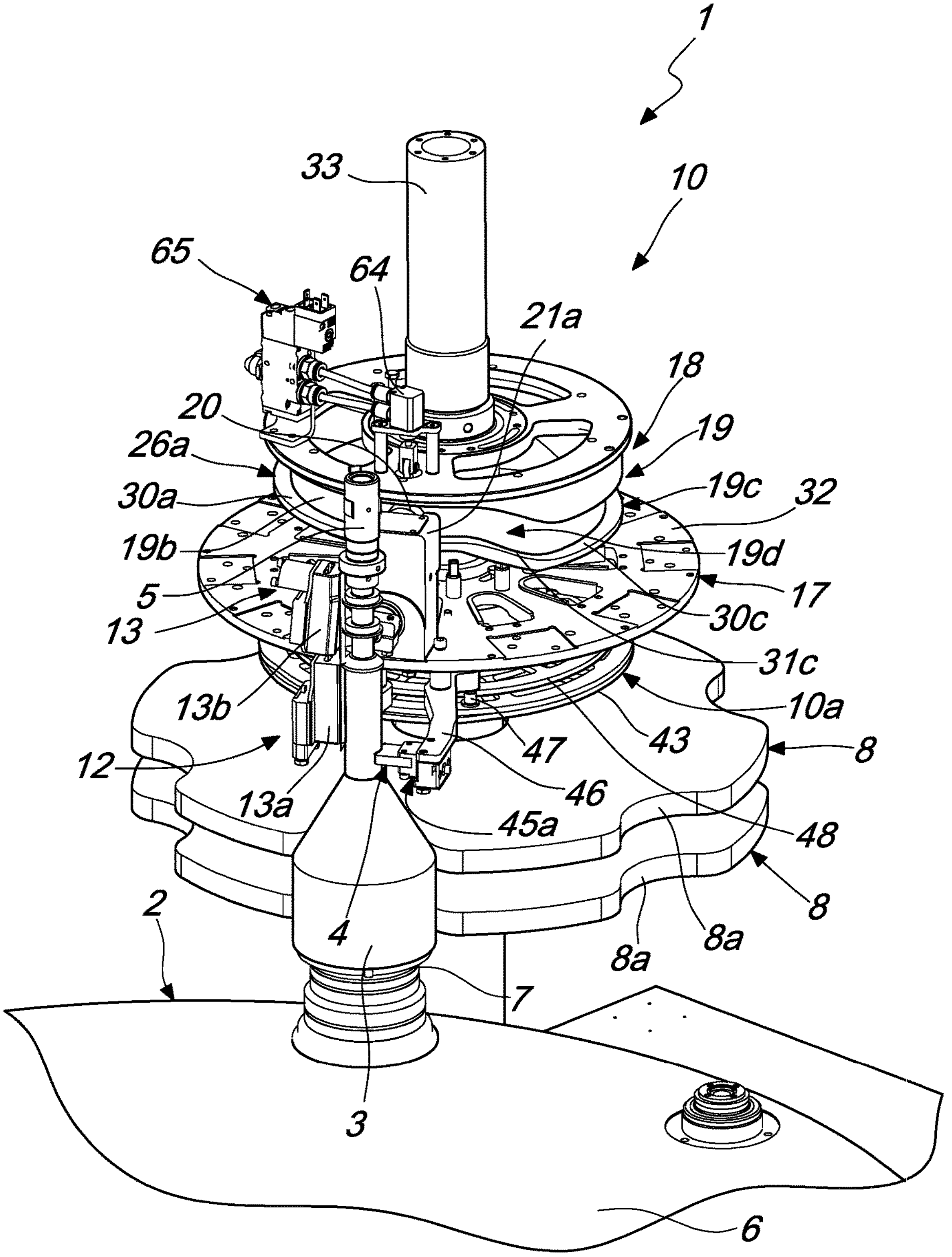
Figure 4A:
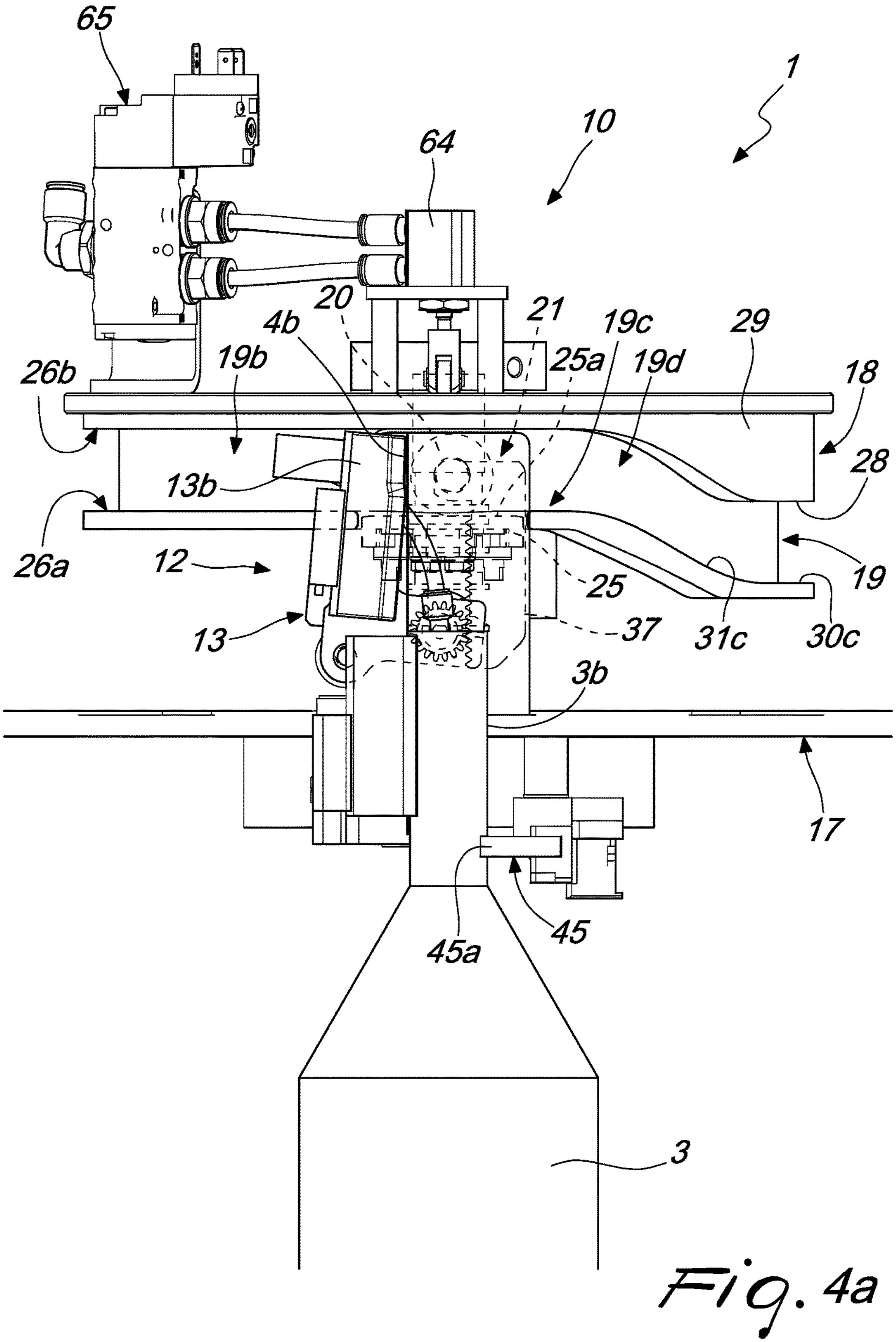
Figure 4B:
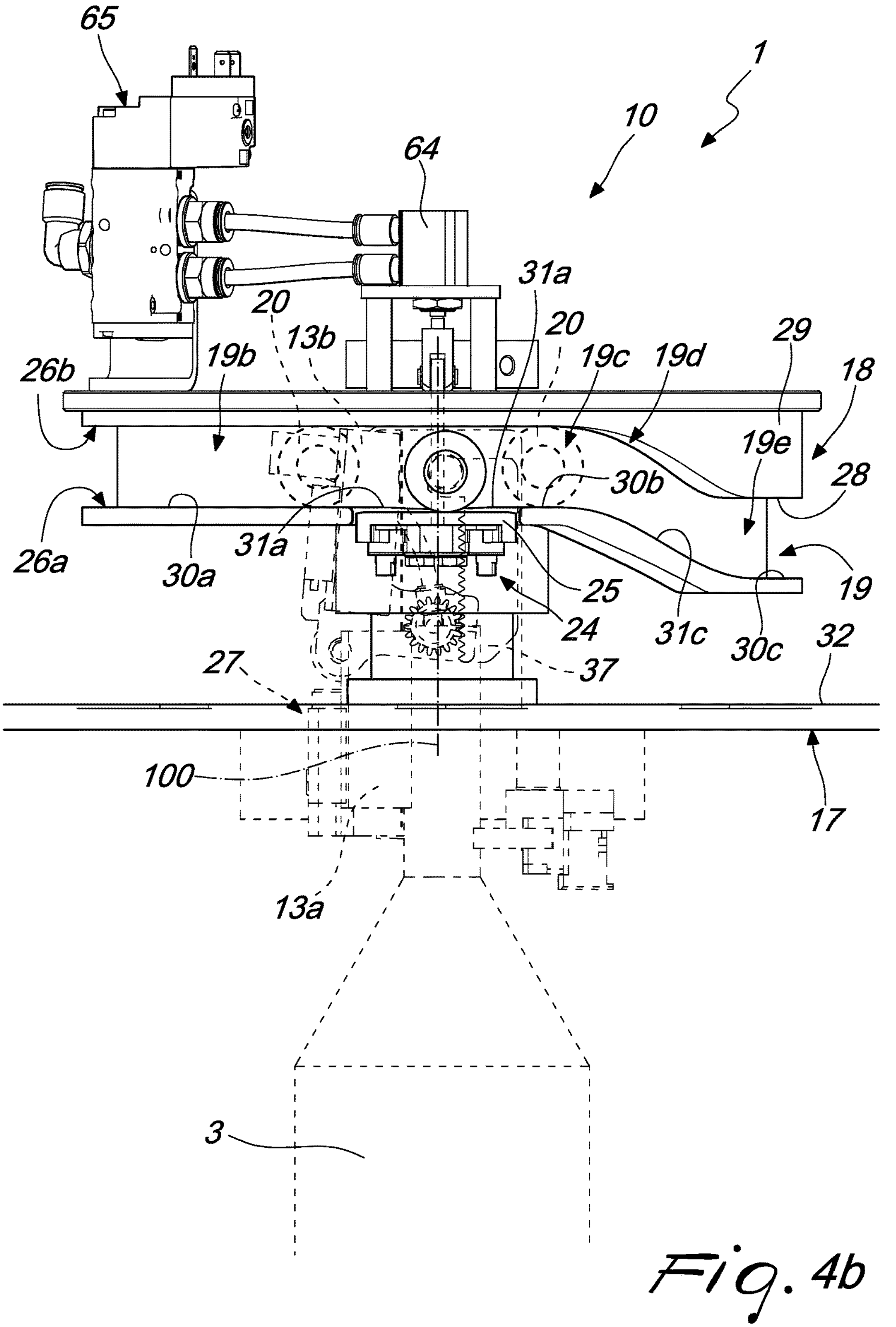
Figure 5:
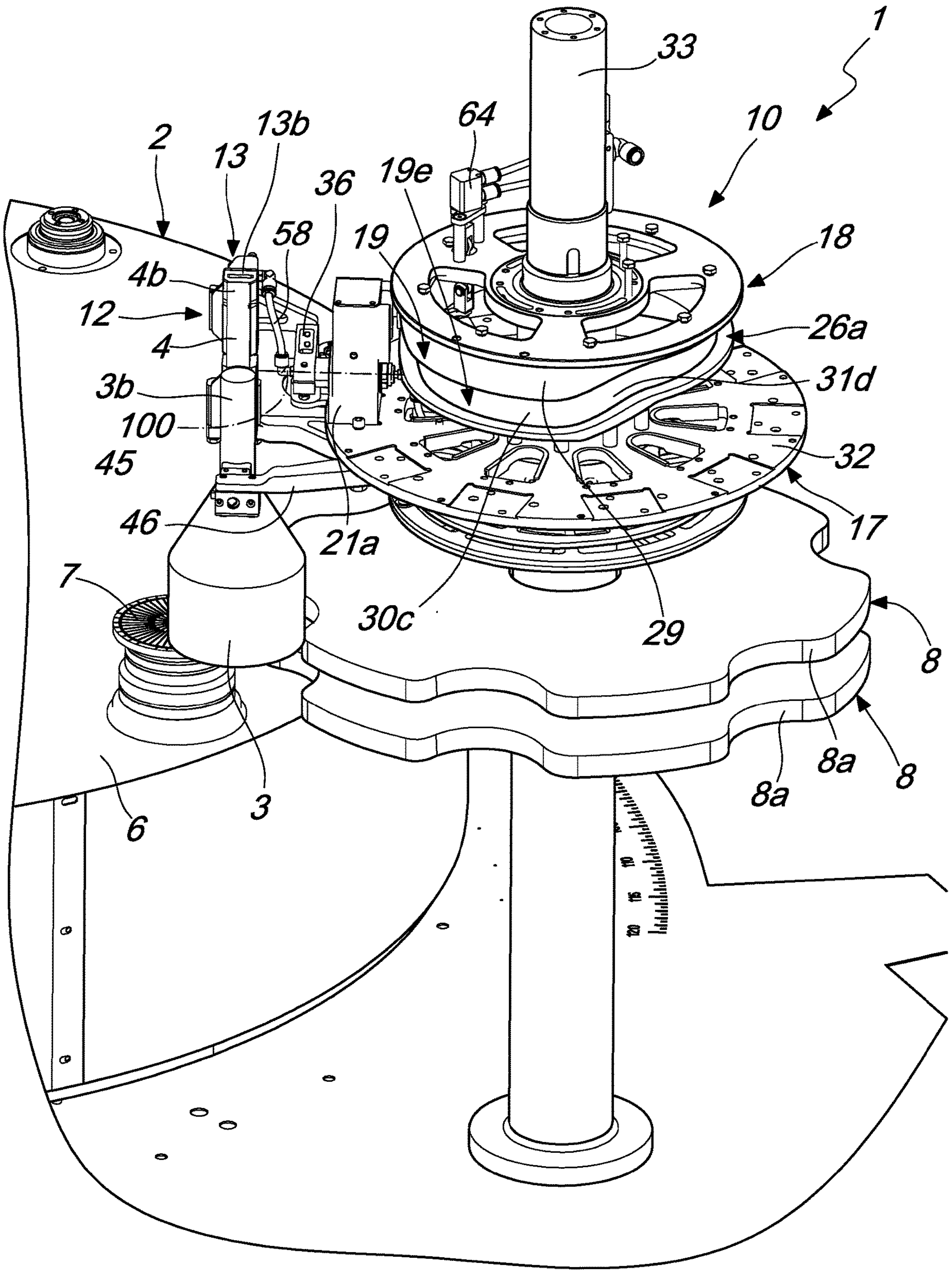
Figure 5A:
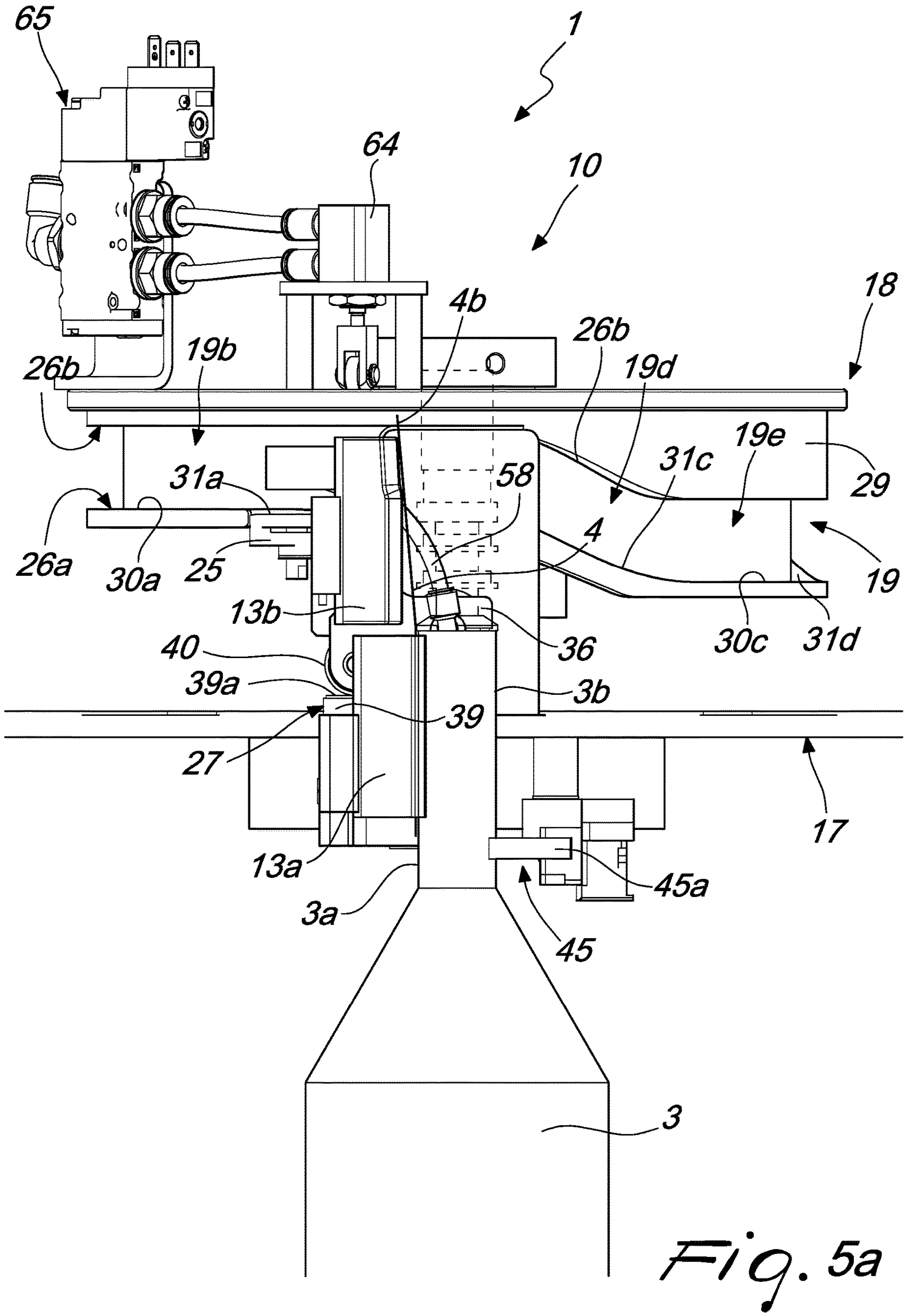
Figure 6:
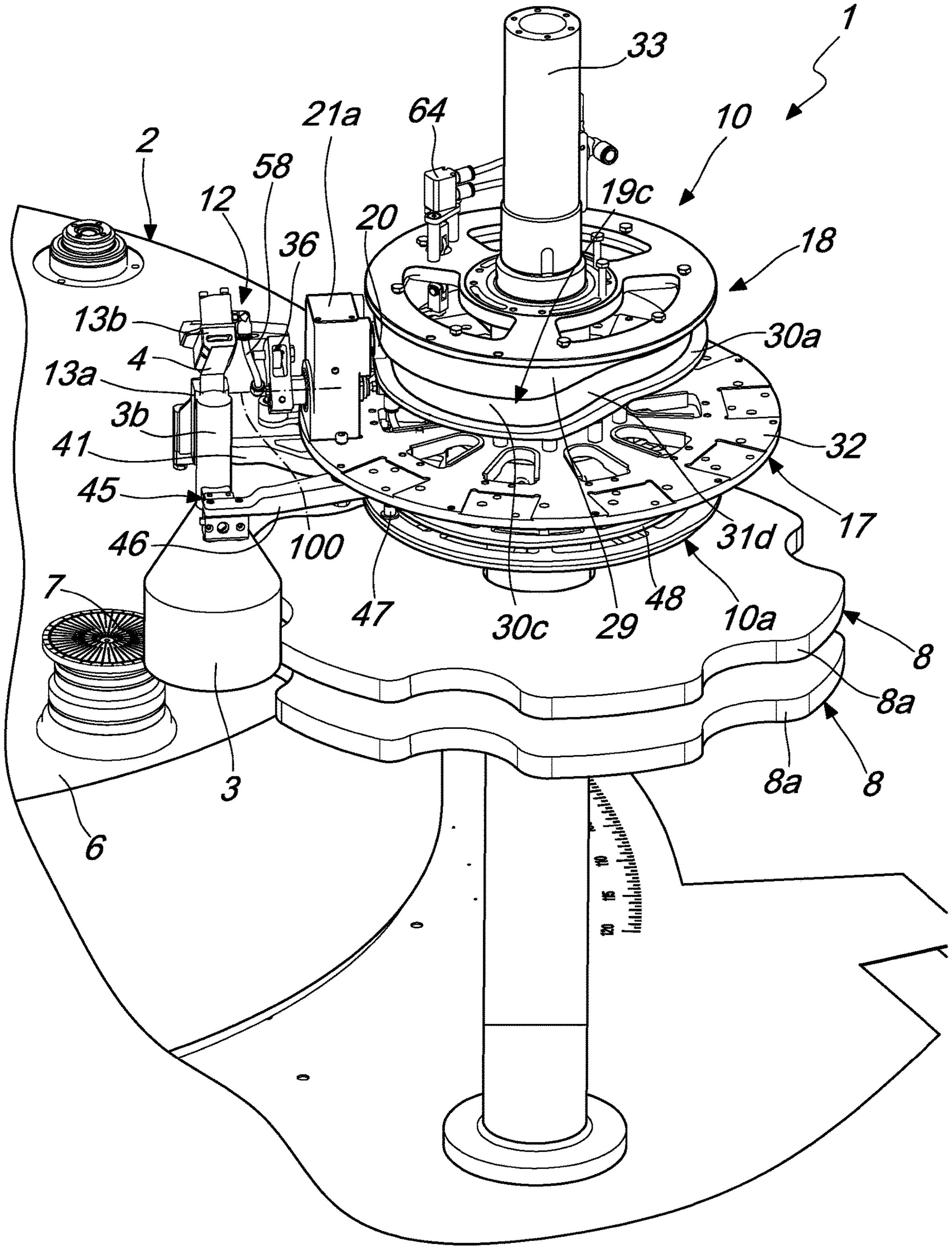
Figure 6A:
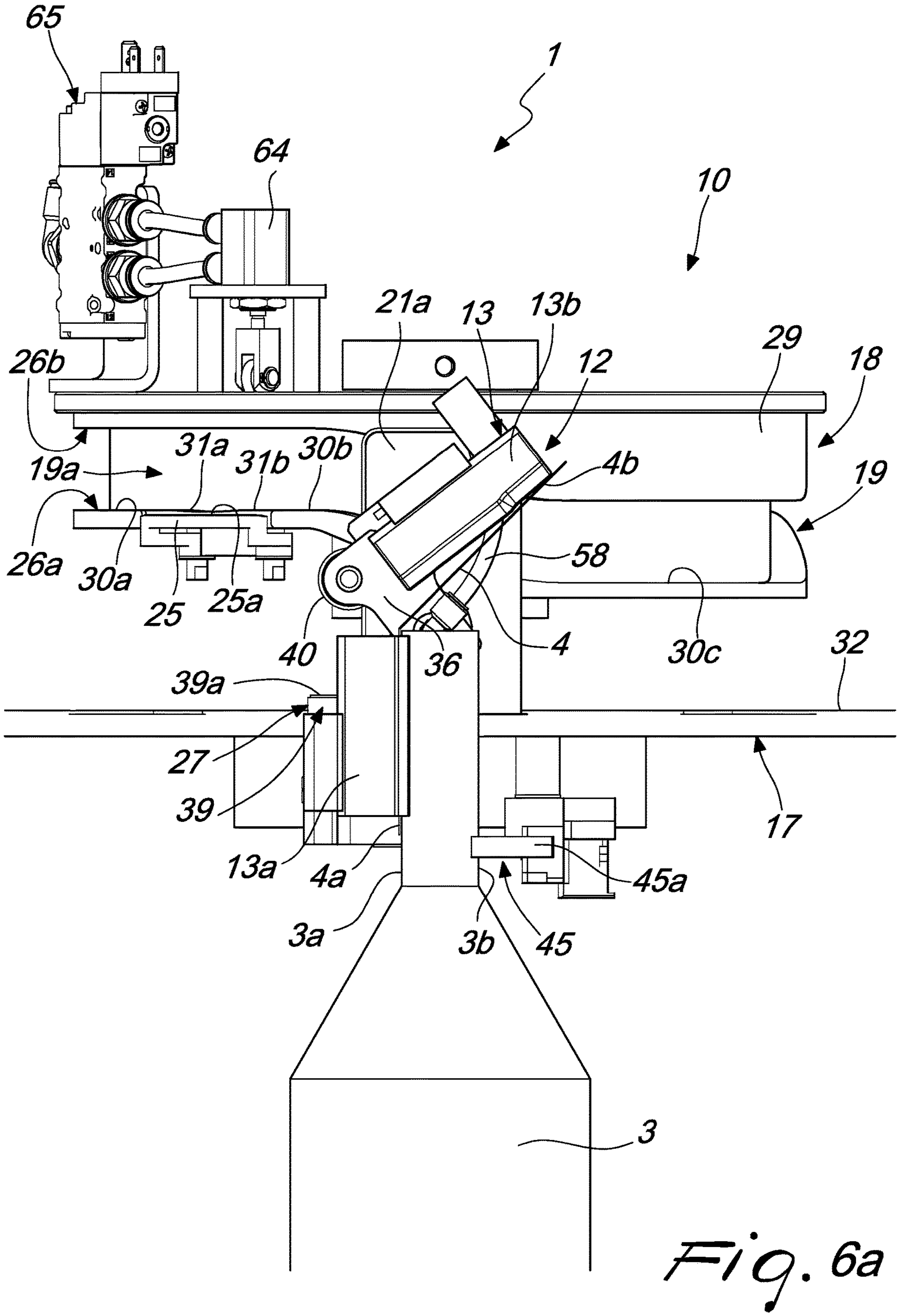
Figure 7:
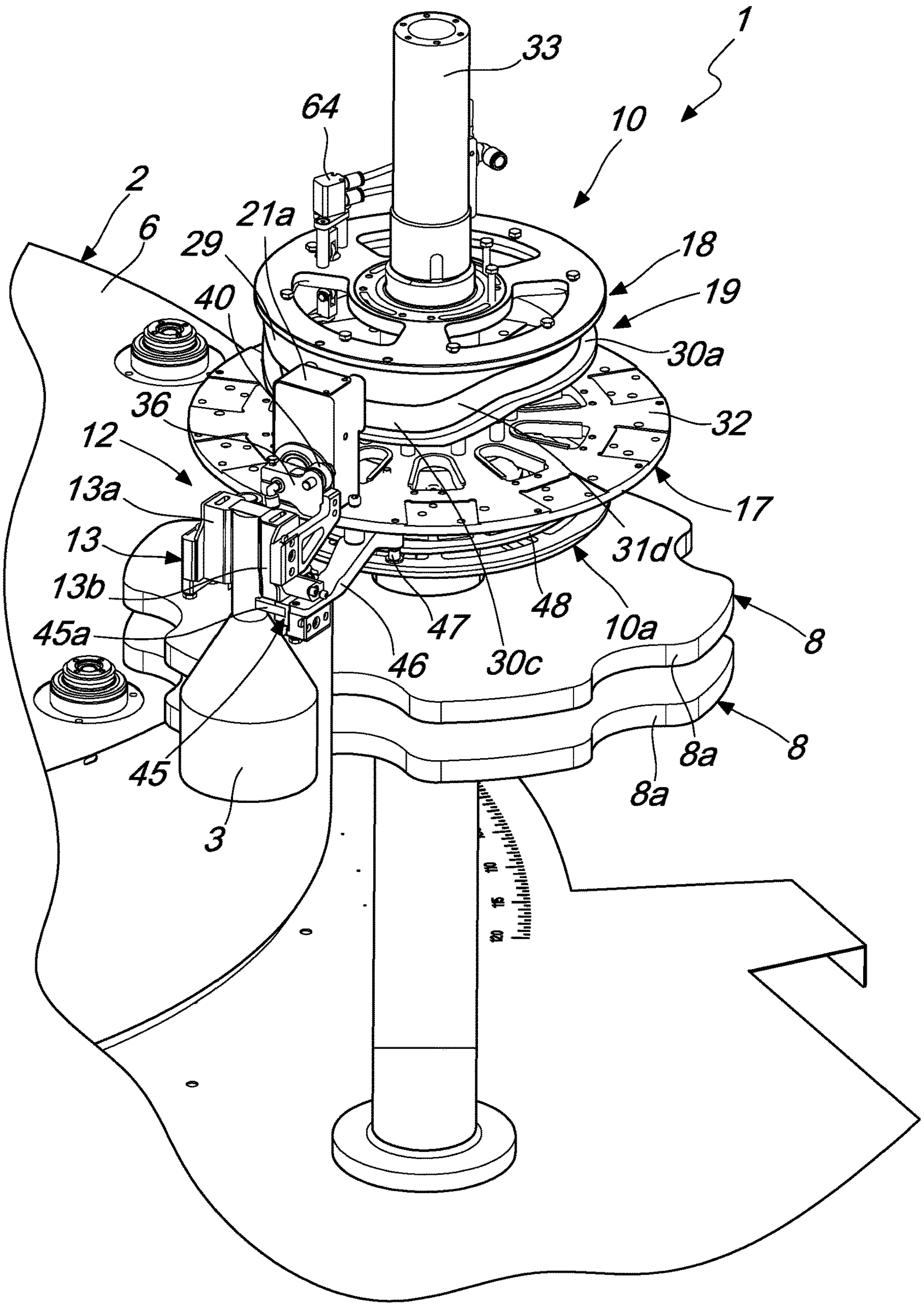
Figure 7A:
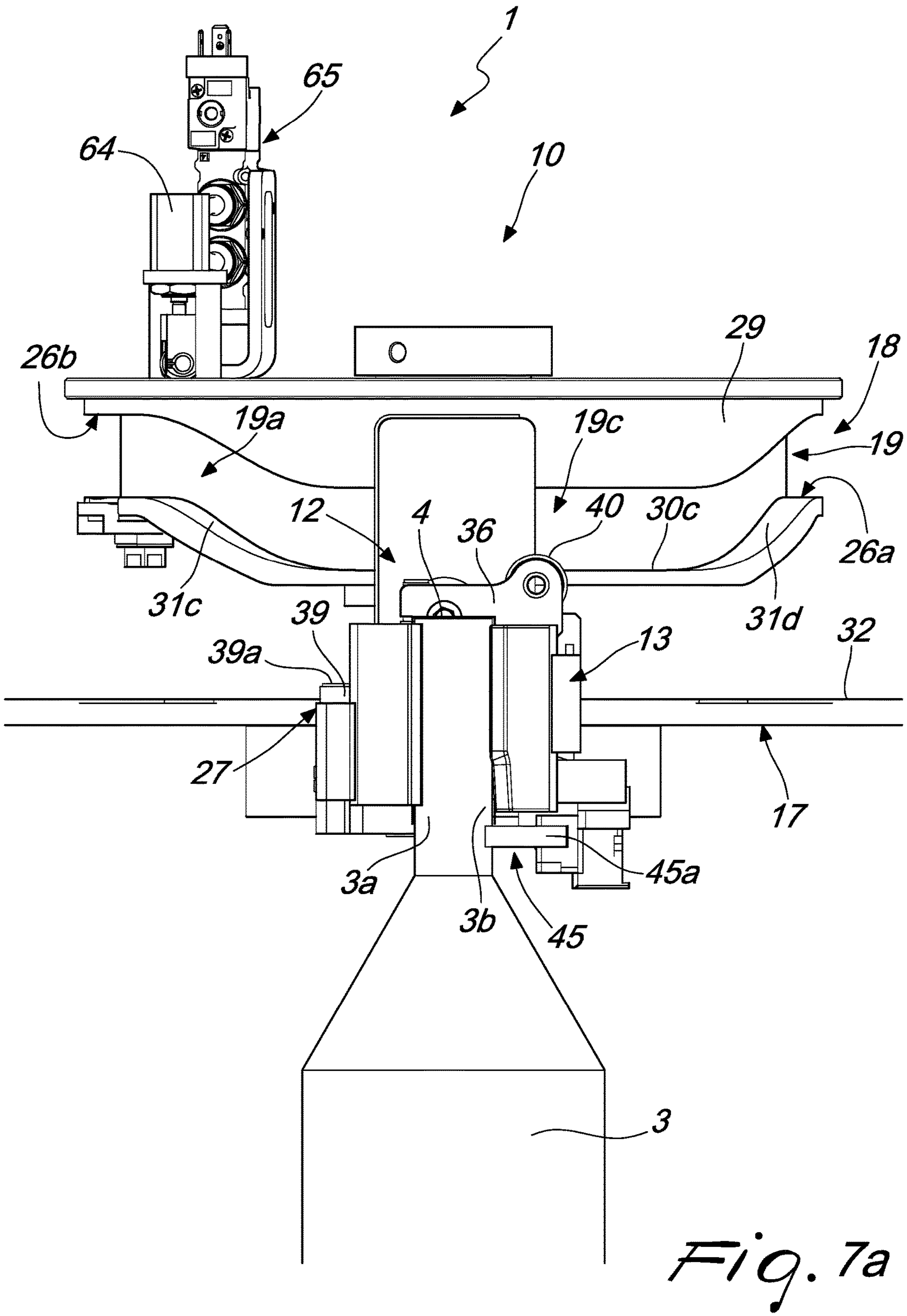
Figure 8:
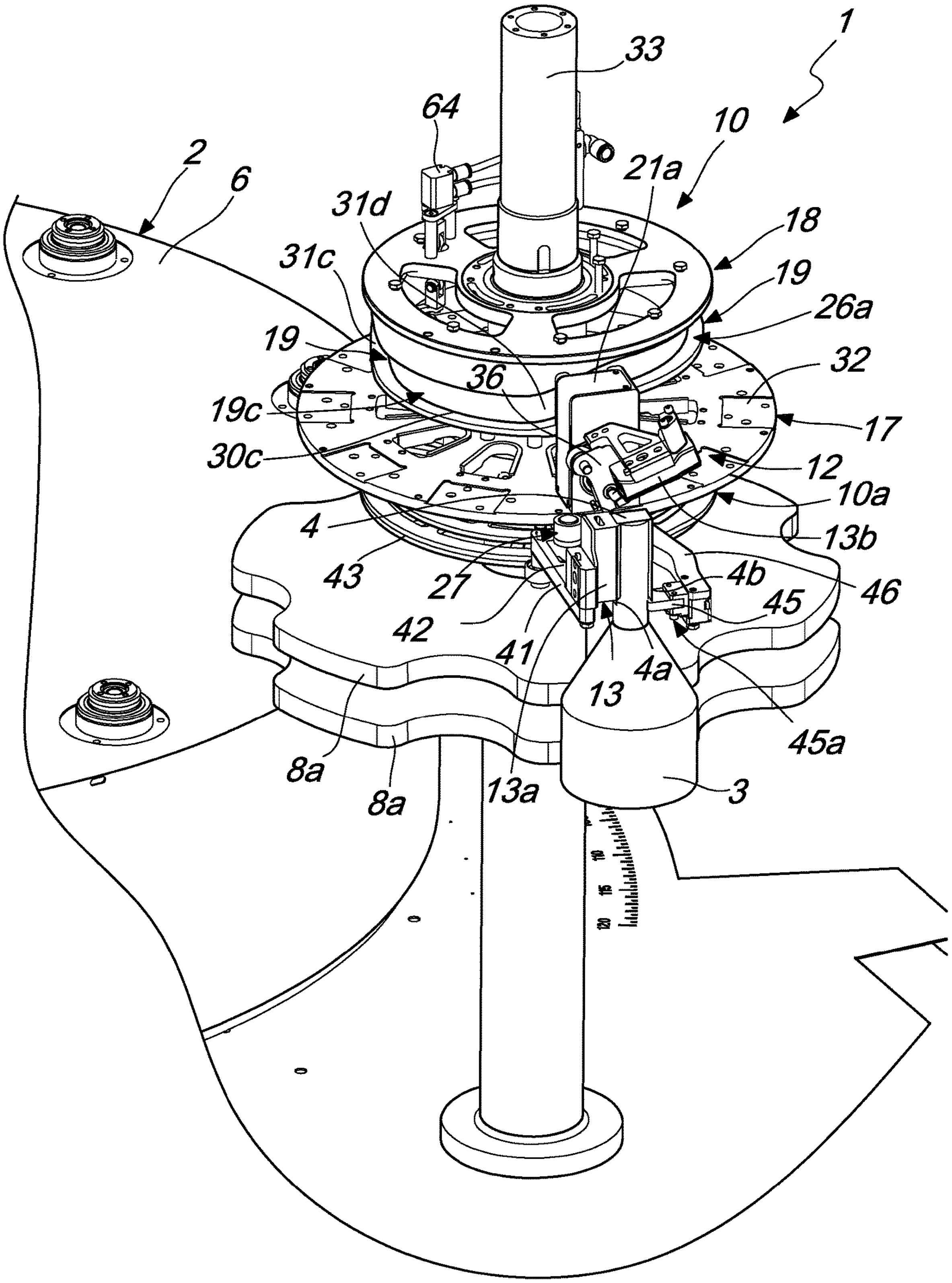
Figure 8A:
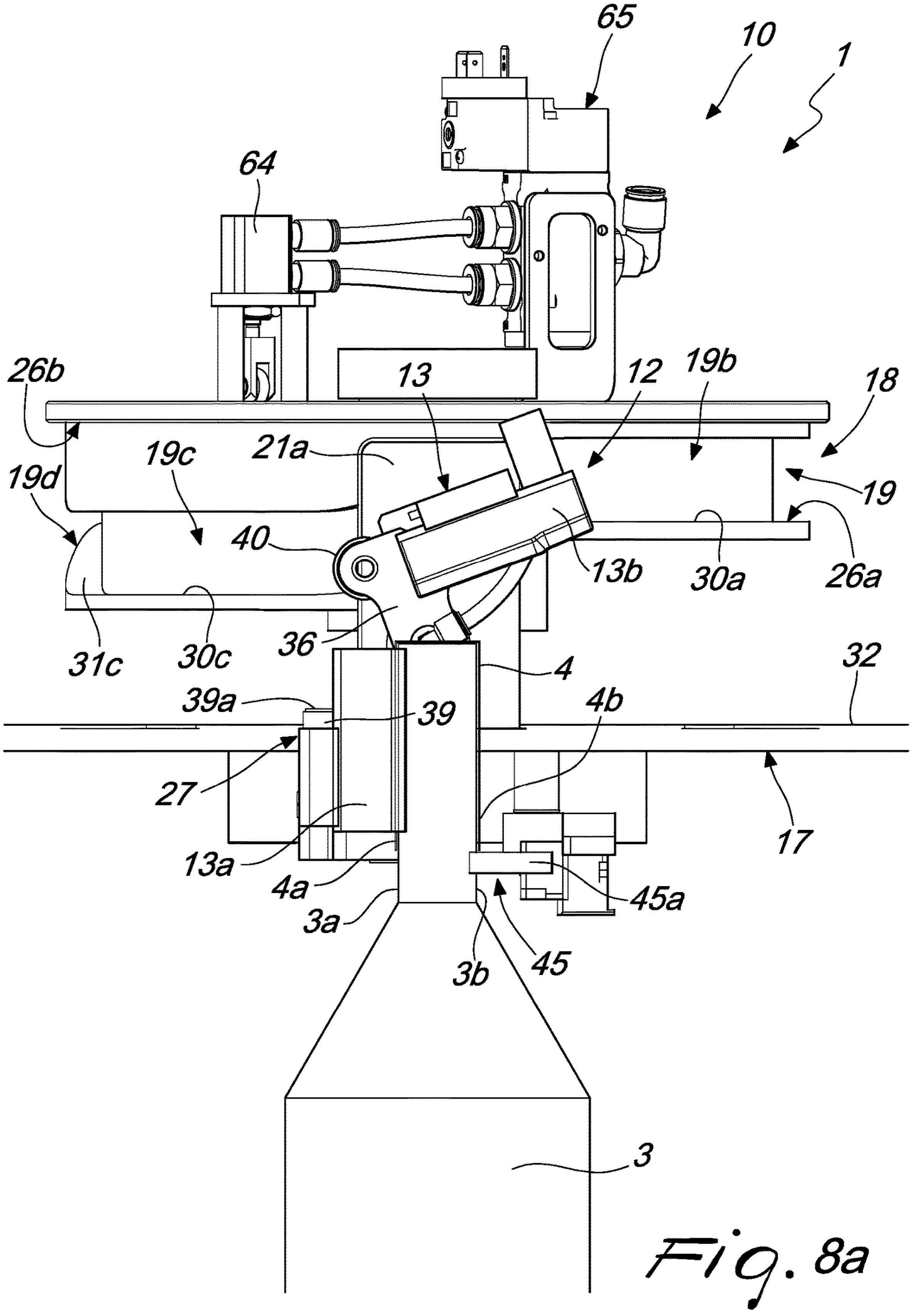
Figure 9:
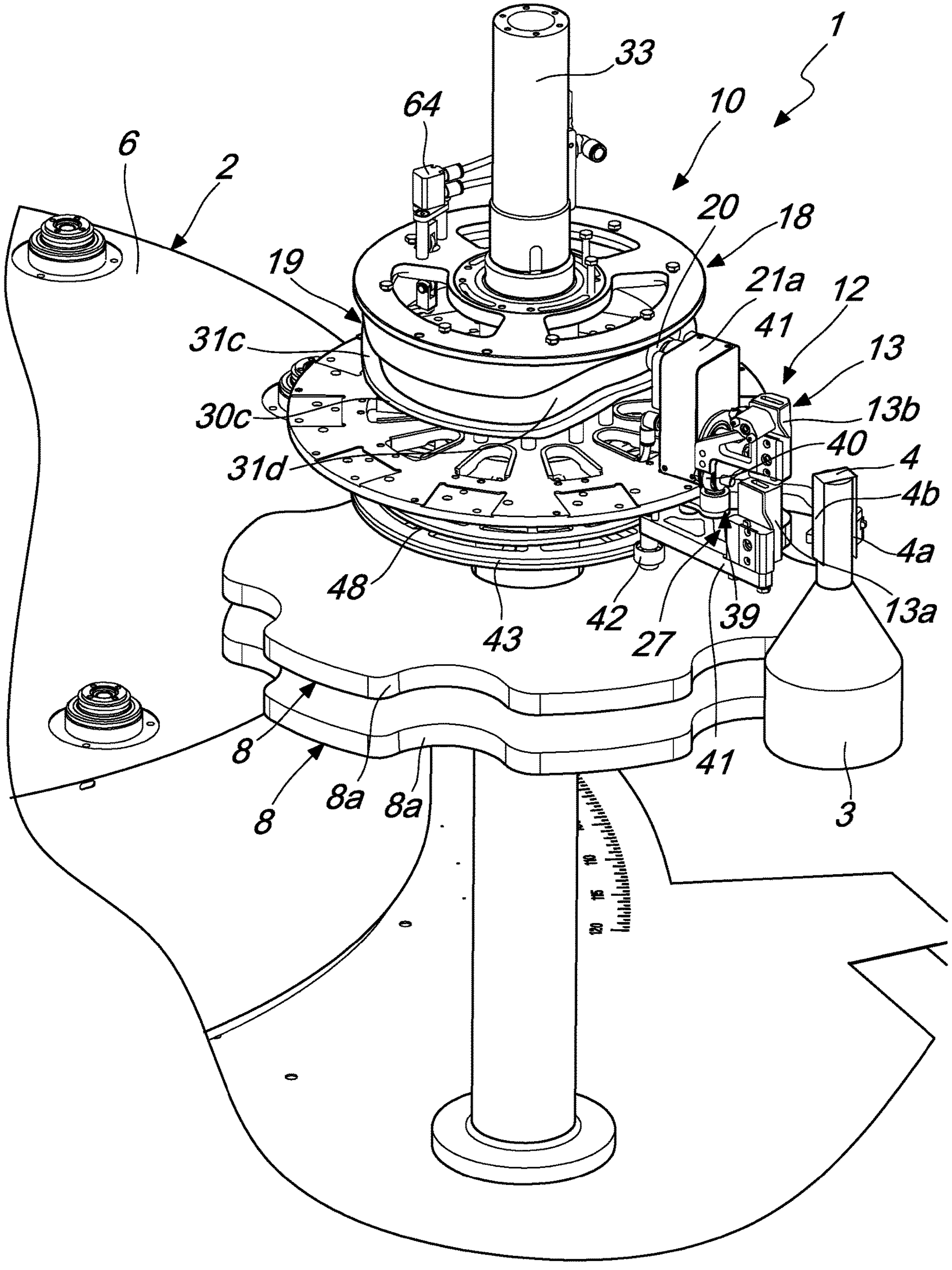
Figure 9A:
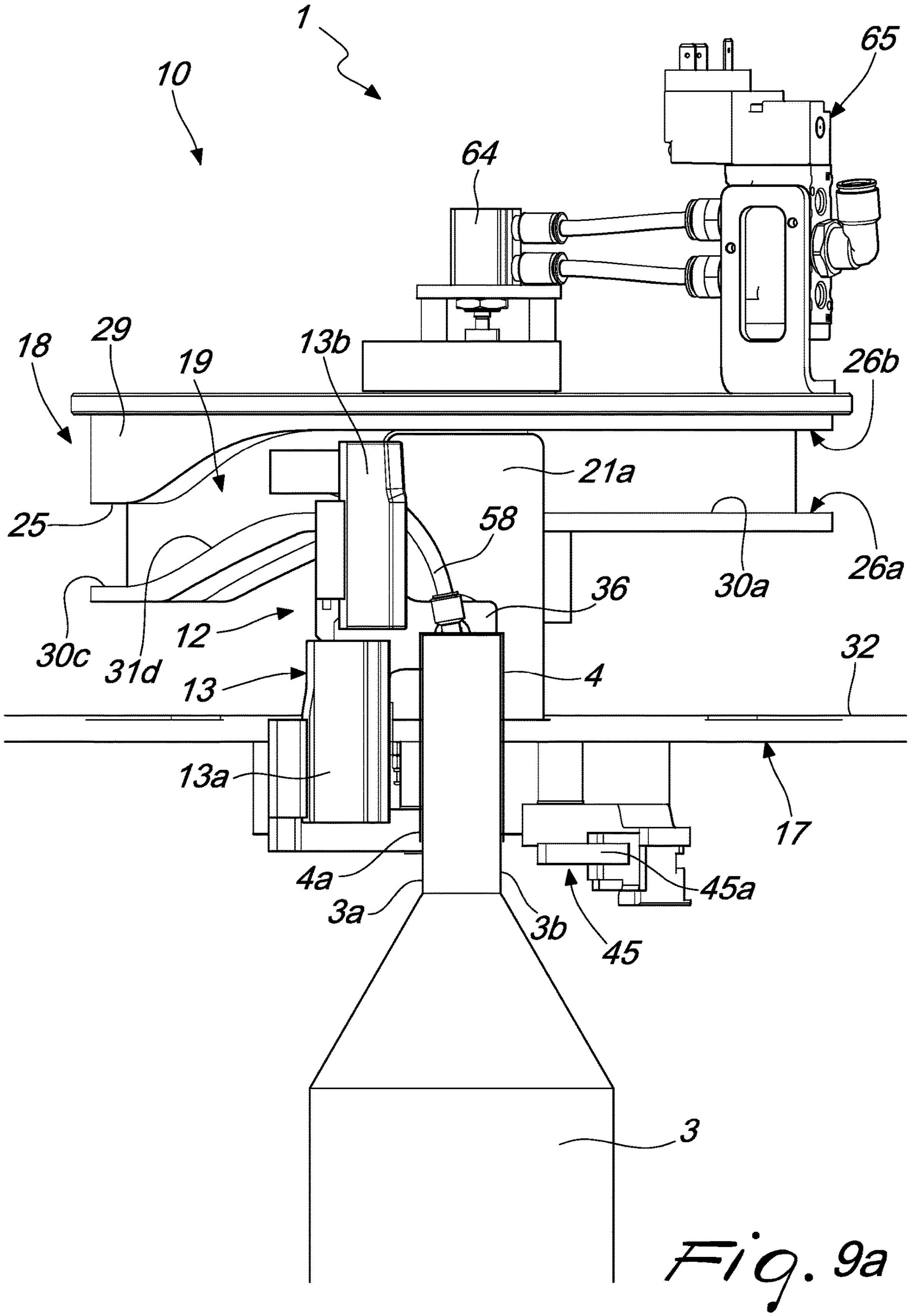
Figure 10:
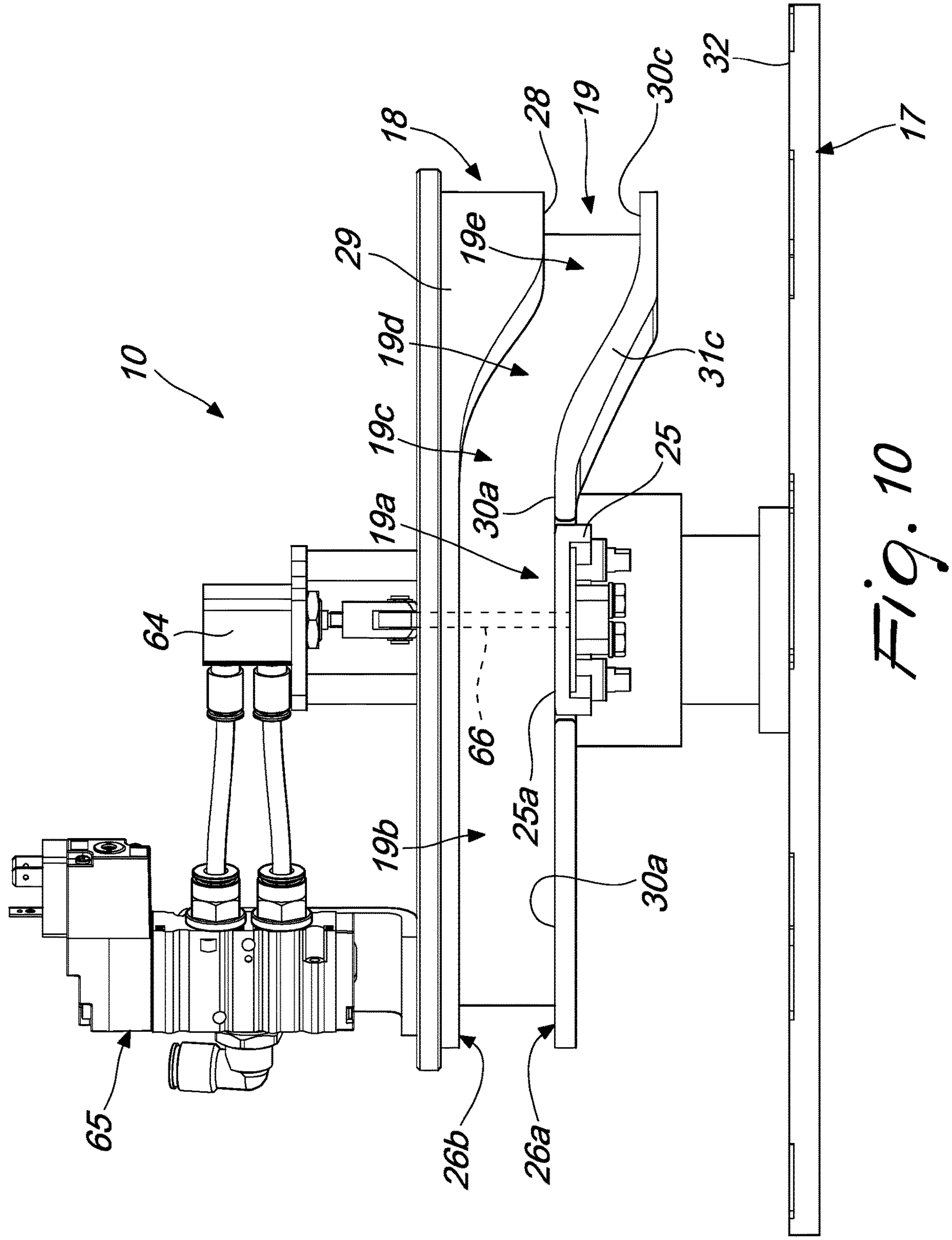
Figure 11:
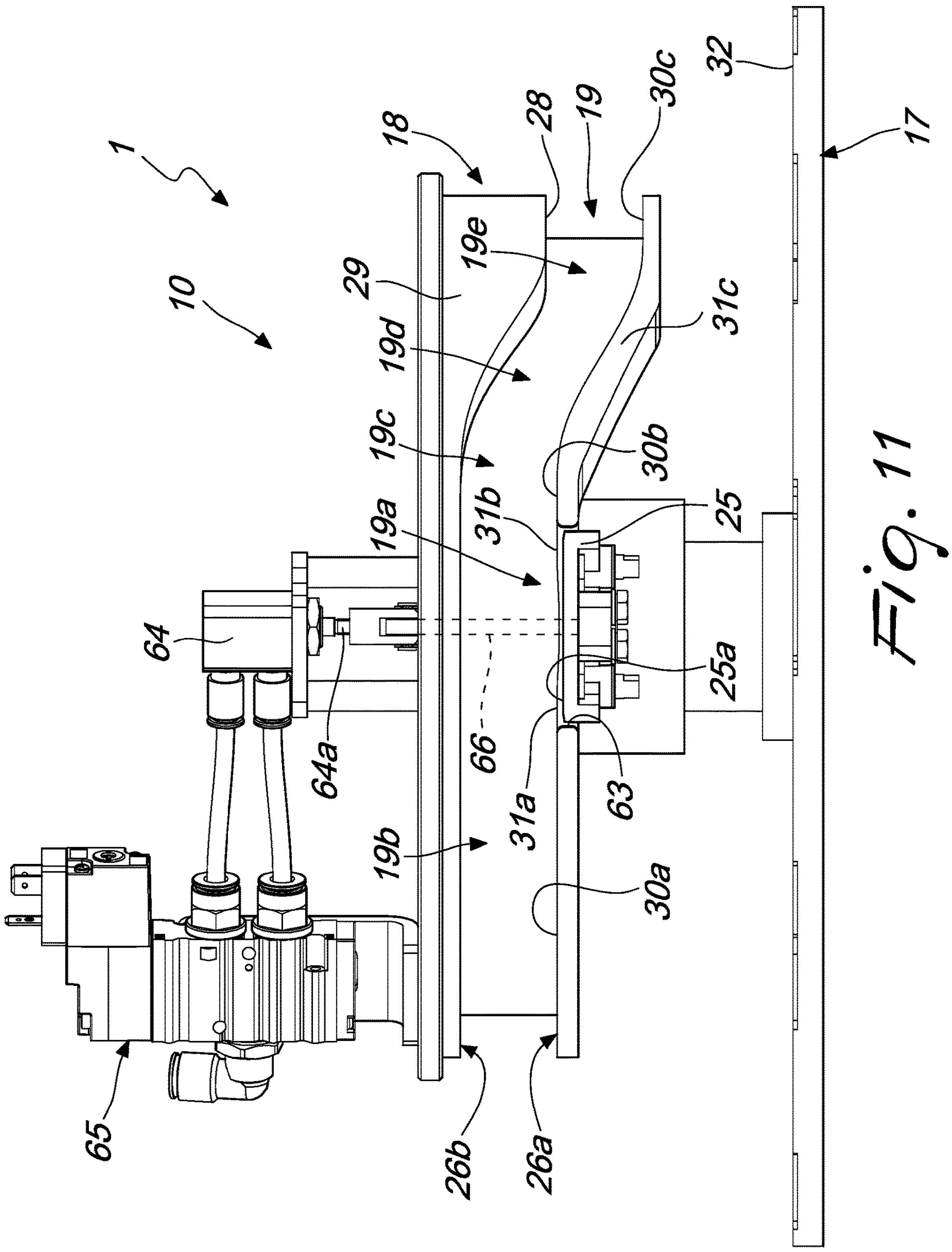
Figure 12:
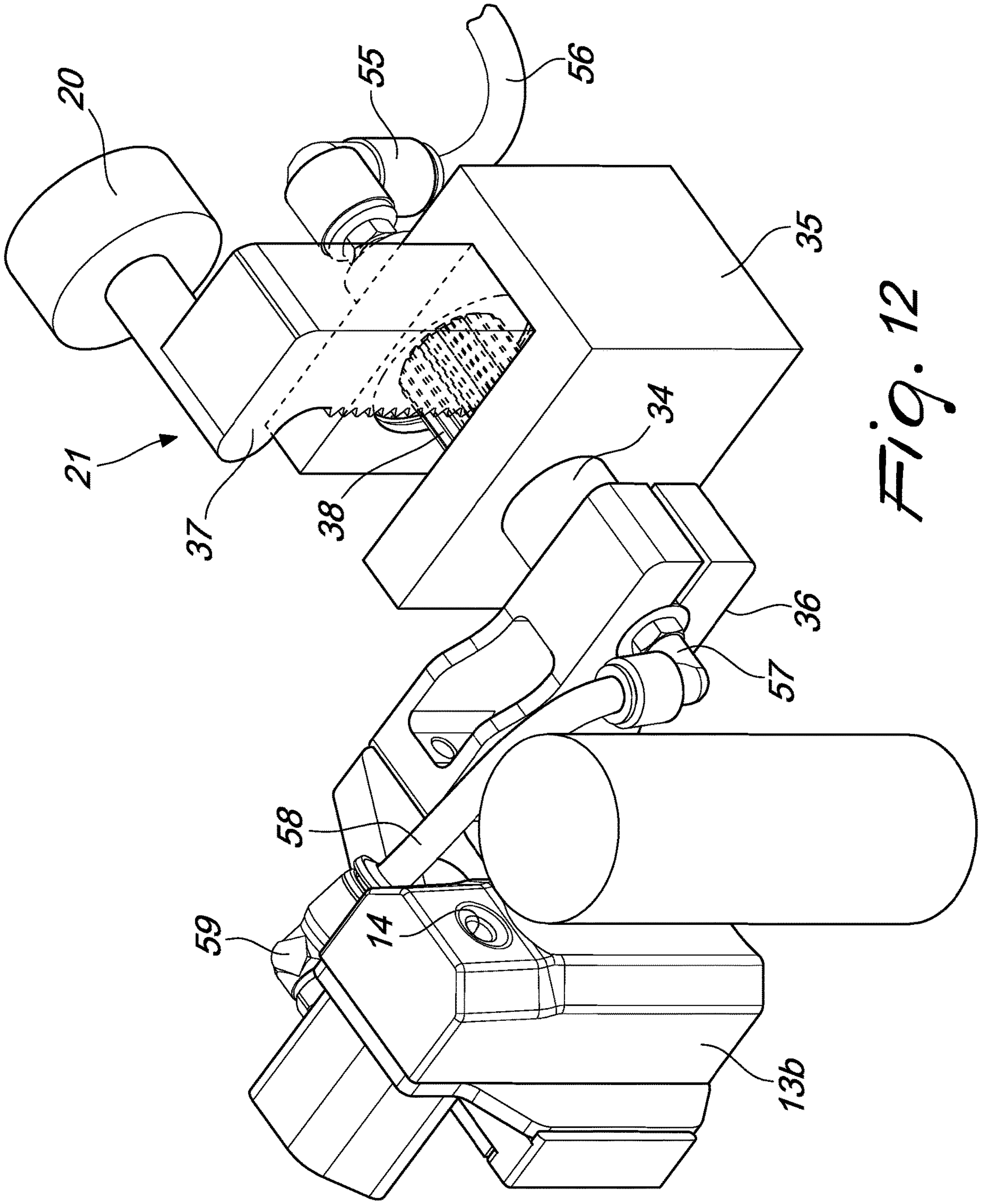
Figure 13:
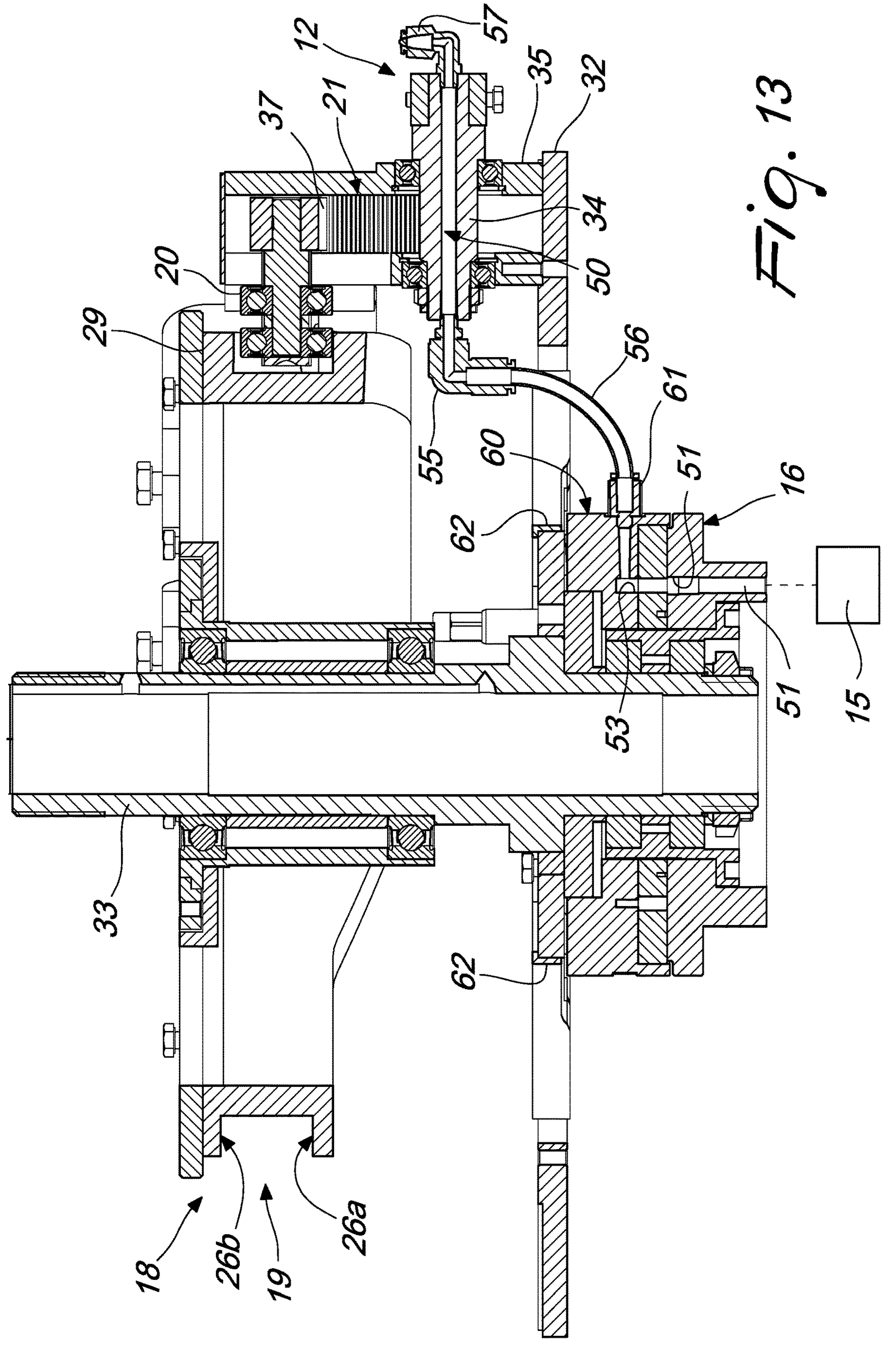
Figure 14:
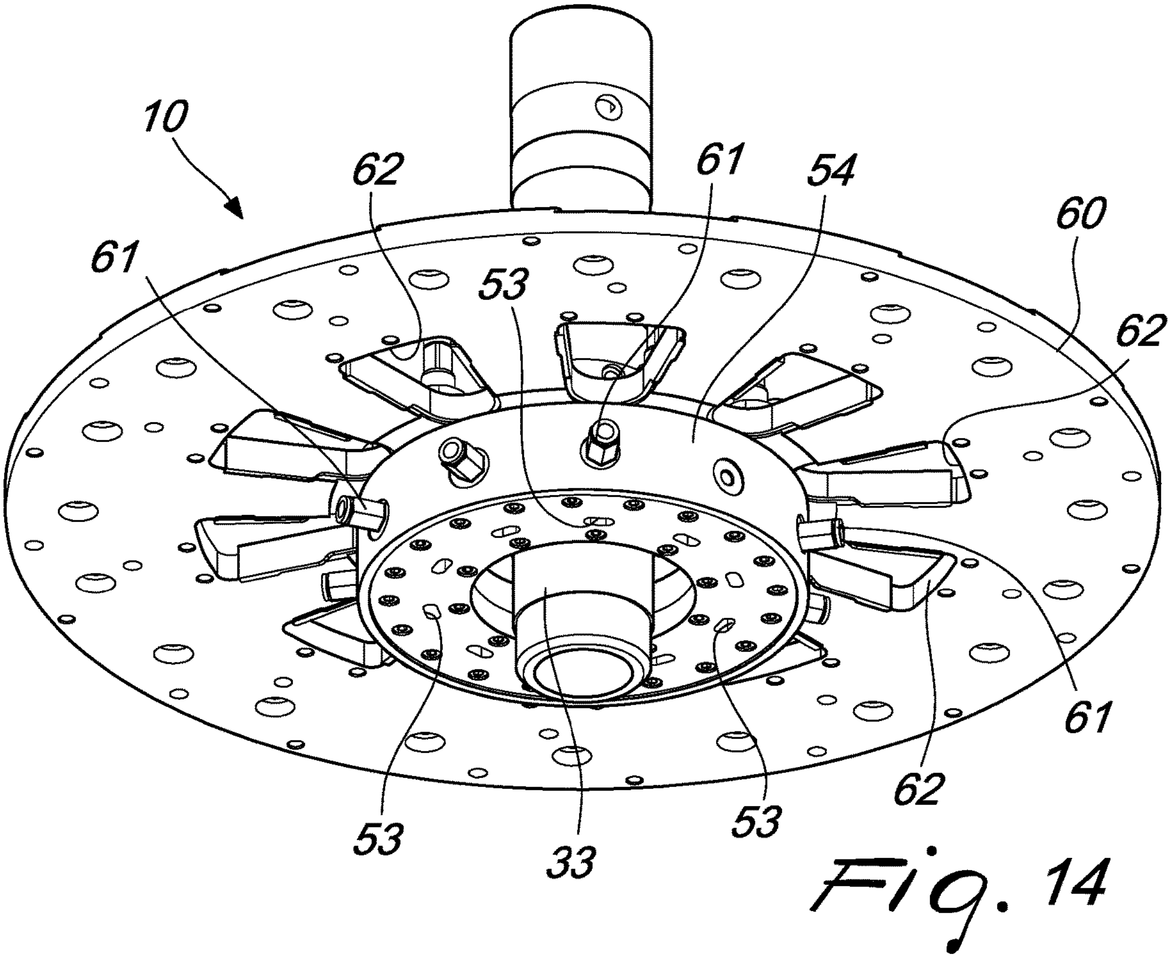
Figure 15:
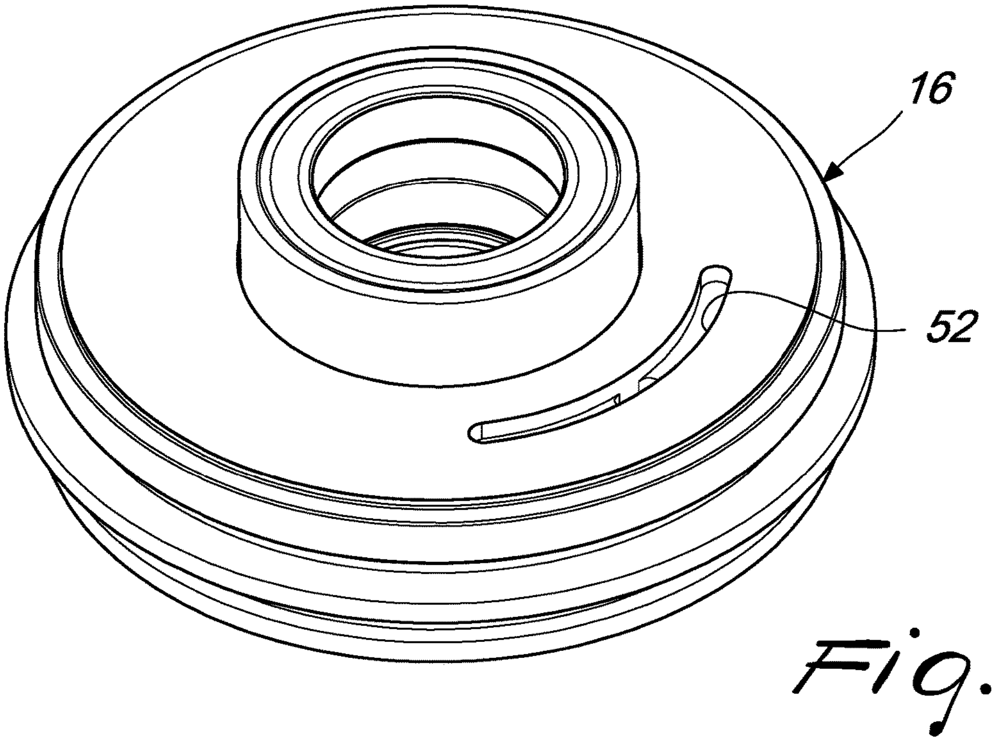

FIG. 3*a* is a front elevation view of the application station according to FIG. 3, with a retention head acting on the container omitted for the sake of greater clarity;

FIG. 4 is a perspective view of the application station wherein a second pad of the application assembly has been brought to a position for the pick-up of a safety strip;

FIG. 4*a* is a front elevation view of the application station according to FIG. 4 with the retention head that acts on the container omitted and with portions shown in phantom lines;

FIG. 4*b* is a view similar to FIG. 4*a*, in which the container and the application assembly are shown in phantom lines, in order to highlight a follower roller of a cam-based actuation device and the positions assumed thereby in its movement along a sliding guide;

FIG. 5 is a perspective view of the application station, with the retention head of the container omitted for the sake of greater clarity, wherein the container starts to leave a carousel and the second pad is in an idle position with the safety strip, picked up by the retention head, retained;

FIG. 5*a* is a front view of FIG. 5;

FIG. 6 is a perspective view of the application station wherein the second pad, with the retained safety strip, is in a step of movement from the idle position to a position for application of the safety strip on the container;

FIG. 6*a* is a front view of the application station of FIG. 6;

FIG. 7 is a perspective view of the application station wherein the second pad has reached the application position;

FIG. 7*a* is a front view of the application station of FIG. 7;

FIG. 8 is a perspective view of the application station wherein the safety strip has been applied to the container and the second pad is in a step of movement from the application position to the waiting position;

FIG. 8*a* is a front view of the application station of FIG. 8;

FIG. 9 is a perspective view of the application station wherein the container with the safety strip applied leaves the application station;

FIG. 9*a* is a front view of the application station of FIG. 9;

FIG. 10 is a front elevation view of a cam-based actuation device of the application station, highlighting means for varying the shape of the cam-based actuation device in the activated condition;

FIG. 11 is a view similar to that of FIG. 10 but with the means for varying the shape of the cam-based actuation device in a deactivated condition;

FIG. 12 is a perspective view of a portion of the application assembly;

FIG. 13 is a sectional view of the application station;

FIG. 14 is a bottom perspective view of a portion of the application station;

FIG. 15 is a perspective view of a pressurized air distribution unit of the application station.

With reference to the figures, the machine for applying safety strips to the upper part of containers according to the invention, generally designated by the reference numeral 1, comprises conveyance means 2 that allow to move the containers 3 on which the safety strips 4 are applied along an advancement path.

The conveyance means 2 are provided with retention heads 5 which are designed to act in an upper region on the containers 3, in order to keep them in position on the conveyance means 2.

In particular, the conveyance means 2 are conveniently constituted by a carousel 6 which is rotationally movable about its own axis and is provided, along its peripheral region, with a plurality of plates 7, each designed to receive in resting contact, a single container 3 and rotationally movable in order to allow the possibility to rotate the containers 3 about the corresponding axes.

In this case, above each plate 7 of the carousel 6 there is a respective retention head 5, which can move integrally with the rotational movement of the carousel 6 about its own axis and is designed to act on the container 3 that rests on the respective underlying plate 7, so as to ensure its retention in a resting position on the respective plate 7.

In particular, each retention head 5 is capable of performing, during the rotation of the carousel 6, a translation movement in a vertical direction between an idle condition, which is assumed at the regions where the containers 3 enter and exit from the carousel 6 and in which it is arranged in an upper region and spaced from the corresponding underlying plate 7, so as to allow the loading and unloading of the corresponding container 3 from the corresponding underlying plate 7, and an active condition, which is assumed during the travel of the containers 3 from the entry region to the region for exit from the carousel 6, where it is closer to the corresponding plate 7 with respect to the idle condition, in order to allow the retention head 5 to act on the respective container 3 so as to press it against the corresponding plate 7.

Advantageously, substantially at the region where the containers 3 exit from the carousel 6, the conveyance means 2 comprise, moreover, at least one output star conveyor 8, which can rotate about its own axis, is arranged laterally to the carousel 6 and is designed to pick up the containers 3 that pass on the carousel 6, moving them away from said carousel.

In particular, the output star conveyor 8 is provided peripherally with a plurality of receptacles 8*a* designed to receive each a respective container 3 that arrives from the carousel 6.

At the exit region of the carousel 6, there might optionally be two or more output star conveyors 8 which mutually overlap along their axis and are designed to engage portions of the containers 3 arranged at a mutually different height along the axis of said containers.

Figure 1:
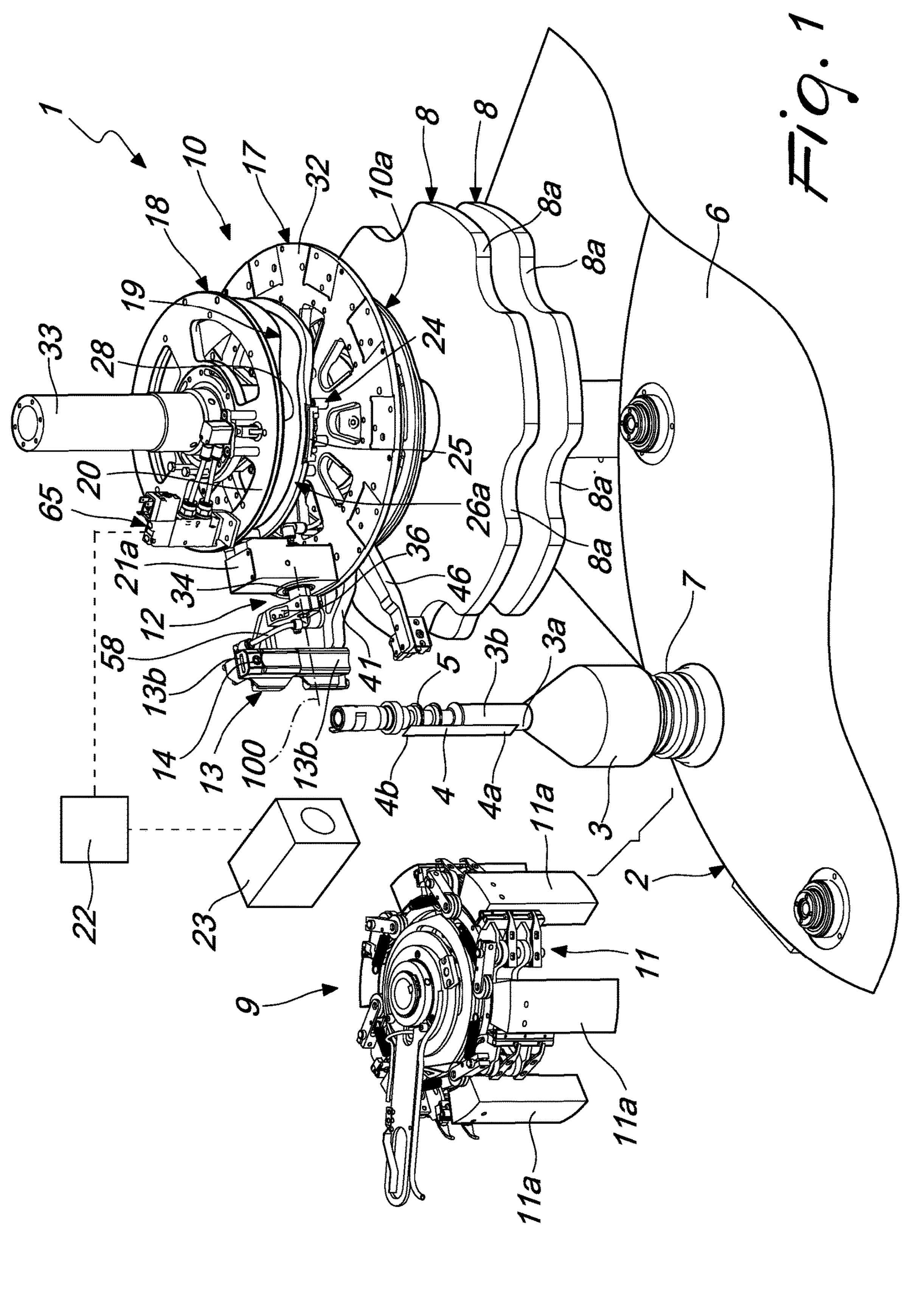
FIG. 1 is a partial perspective view of the machine according to the invention.
Figure 2:
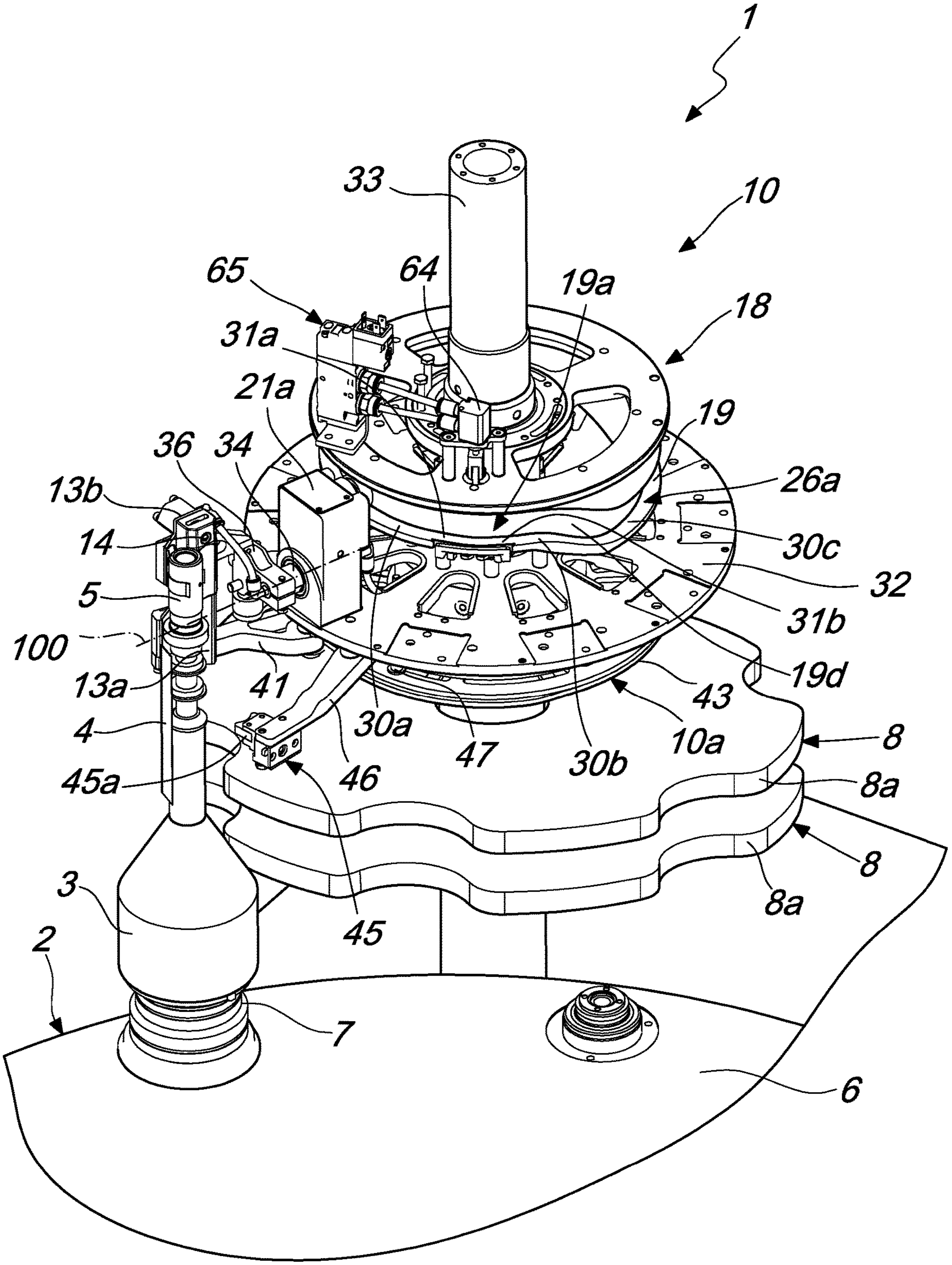
FIG. 2 is a perspective view of a portion of the machine according to the invention wherein a container is arriving at an application station of the machine.

As can be seen in FIG. 1, along the advancement path of the containers 3 defined by the conveyance means 2 there are, in mutual succession, at least one transfer station 9 and at least one application station 10.

In greater detail, the transfer station 9 allows to transfer a respective safety strip 4 to the upper part of the containers 3 which is arranged substantially vertically and with a first end 4*a* thereof, arranged downward, applied on a first lateral portion 3*a* of the corresponding container 3 and a second end 4*b* thereof, arranged upward, applied on the retention head 5 which acts on the corresponding container 3.

The application station 10 allows instead to complete the application on the containers 3 of the safety strips 4 transferred by the transfer station 9 onto said containers, making the second end 4*b* of the safety strips 4 adhere on a second lateral portion 3*b* of the corresponding container 3 that is arranged on the side opposite to the first lateral portion 3*a*, so that the safety strip 4 of each container 3 is arranged so as to straddle the upper part of the corresponding container 3.

It should be noted that the first portion 3*a* and the second portion 3*b* of the containers 3 on which the first end 4*a* and the second end 4*b* of the safety strips 4, respectively, are made to adhere, are arranged at the upper or top part of said containers, and more particularly, at least if the containers 3 are for example constituted by bottles, are arranged at the neck of the containers 3.

As in the illustrated embodiment, the transfer station 9 can conveniently comprise a transfer drum 11, mounted so that it can rotate about a substantially vertical axis and designed to receive from a magazine, not shown, arranged laterally to the transfer drum 11, the safety strips 4 to be transferred onto the containers 3, in a per se known manner.

In particular, the safety strips 4 picked up from the magazine are retained by the transfer drum 11 at adapted sectors 11*a*, provided at its peripheral region, and entrained until they adhere on the containers 3 that transit on the carousel 6.

The safety strips 4 can be of the pre-adhesive type or are provided with glue on their face designed to be applied to the containers 3, by virtue of gluing means, which are arranged laterally to the transfer drum 11 and are constituted for example by a glue roller, not shown.

The application station 10 comprises, in turn, a fixed structure 10*a* and at least one application assembly 12 which can move, with respect to the fixed structure 10*a* of the application station 10, in a manner that is synchronized with the movement performed by the containers 3 on the conveyance means 2 and along a trajectory that is at least partially substantially parallel to at least one portion of the advancement path of the containers 3, so as to allow each application assembly 12 to be able to follow a respective container 3 at least along said portion of its advancement path.

Each application assembly 12 has at least one crimping device 13, designed to operate on the safety strip 4 of the corresponding container 3, in order to complete its application.

More particularly, the crimping device 13 of each application assembly 12 comprises a first pad 13*a*, designed to act substantially on the first end 4*a* of the safety strip 4 or, in any case, on a lower portion thereof, and a second pad 13*b*, designed in turn to act substantially on the second end 4*b* of the safety strip 4 or in any case on an upper portion thereof, in order to apply it on the second portion 3*b* of the corresponding container 3.

In particular, the first pad 13*a* is designed to contact, with a working face, substantially the first end 4*a* of the safety strip 4 applied to the corresponding container 3 or in any case with a portion of said safety strip that is proximate to its first end 4*a*.

The second pad 13*b* is instead provided, on its working face, with suction means for the removable retention of the safety strip 4 and, more precisely, of the second end 4*b* of the safety strip 4 or in any case of a portion of the safety strip 4 that is proximate to its second end.

In particular, the second pad 13*b* can be actuated in motion so that it can oscillate, in relation to the first pad 13*a*, about a rotation axis 100, which is axially offset with respect to the extension axis of the second pad 13*b*, in order to allow the second pad 13*b* to perform oscillation movements with respect to the first pad 13*a* around the upper part of the corresponding container 3.

The suction means that allow the retention of the second end 4*b* of the safety strip 4 on the working face of the second pad 13*b* are conveniently constituted by at least one suction port 14, which is formed in the working face of the second pad 13*b* and is connectable to a vacuum generator 15, by means of a vacuum distribution unit 16 which is integral with the fixed structure 10*a* of the application station 10, during the movement of the corresponding application assembly 12 with respect to the fixed structure 10*a* of the application station 10, as will be better explained hereinafter as well.

Preferably, each application assembly 12 is supported, with the corresponding crimping device 13, by a supporting structure 17, which is movable with respect to the fixed structure 10*a* of the application station 10.

More particularly, the supporting structure 17 on which the application assemblies 12 of the application station 10 are mounted can rotate about the same axis as the output star conveyor 8.

The oscillation of the second pad 13*b* about its own rotation axis 100 is actuated by means of a cam-based actuation device 18 to which the second pad 13*b* is functionally connected.

In particular, the cam-based actuation device 18 is contoured so as to impart sequentially to the second pad 13*b*, in response to the movement of the application assembly 12, with respect to the fixed structure 10*a* of the application station, at least two oscillation movements about the rotation axis 100, with respect to the first pad 13*a*, and more precisely at least one first oscillation movement and at least one second oscillation movement.

In particular, the cam-based actuation device 18 allows, by virtue of its shape, to impart to the second pad 13*b* the first oscillation movement in order to allow the second pad 13*b* to remove from the retention head 5 that acts on the corresponding container 3 the second end 4*b* of the safety strip 4, retaining it on its working face, by virtue of said suction means, and allows instead to impart to the second pad 13*b* the second oscillation movement, in order to allow the second pad 13*b* to move the second end 4*b* of the safety strip 4 to adhere to the second lateral portion 3*b* of the corresponding container 3, once it has been picked up by the retention head 5 that acts on the corresponding container 3, as will be better explained hereinafter.

In greater detail, the cam-based actuation device 18 comprises advantageously at least one sliding guide 19, which is integral with the fixed structure 10*a* of the application station 10.

In particular, each application assembly 12 comprises at least one respective follower roller 20, which engages slidingly the sliding guide 19 and is connected, by virtue of kinematic transmission means 21, to the second pad 13*b*, so that the motion of the follower roller 20 along the sliding guide 19, during the movement of the corresponding application assembly 12, can determine, by virtue of the kinematic transmission means 21, the first and second oscillation movements of the second pad 13*b*.

Control means 22 are functionally connected to means 23 for detecting the transfer by the transfer station 9 of the safety strips 4 onto the containers 3 that transit on the conveyance means 2 and onto the corresponding retention heads 5.

For example, the detection means 23 can be constituted by a video camera device, a photocell device or another optical device, arranged laterally to the conveyance means 2 and more particularly laterally to the carousel 6 and advantageously arranged between the transfer station 9 and the application station 10, so as to be able to detect, by means of the acquisition of images, the presence or not of the safety strips 4 on the containers 3 that exit from the transfer station 9 and arrive at the application station 10 and on the respective retention heads 5.

Again according to the invention, means 24 for varying the shape of the cam-based actuation device 18 are furthermore provided which are functionally connected to the control means 22 and can be activated on command by the control means 22 upon the detection, by the detection means 23, of the lack of transfer of the safety strip 4 to at least one corresponding container 3 by the transfer station 9, in order to inhibit the execution of the first oscillation movement by the second pad 13*b* in the absence of the safety strip 4 on the corresponding container 3.

Conveniently, the control means 22 comprise an electronic control unit adapted to receive and process the signals that arrive from the detection means 23 and to command, based on the signal that arrives from the detection means 23, the activation or deactivation of the means 24 for varying the shape of the cam-based actuation device 18.

Advantageously, the means 24 for varying the shape of the cam-based actuation device 18 comprise at least one engagement element 25 adapted to interact with the follower roller 20, so as to vary its rule of motion.

In particular, the engagement element 25 can be moved on command, as a consequence of an intervention of the control means 22, between an idle position, assumed when the detection means 23 detect that on the containers 3 that exit from the transfer station 9 and arrive at the application station 10 and on the respective retention heads 5 there is a respective safety strip 4 transferred by the transfer station 9, and a working position, assumed as a consequence of the detection, by the detection means 23, of the lack of transfer of the safety strip 4 to at least one corresponding container 3 by the transfer station 9.

More particularly, in the idle position the engagement element 25 is arranged so as to allow the follower roller 20 to perform a movement along the sliding guide 19 such to produce the first oscillation movement on the part of the second pad 13*b*, while in the working position the engagement element 25 does not allow the follower roller 20 to perform the movement along the sliding guide 19 that determines the execution of the first oscillation movement by the second pad 13*b*.

In greater detail, when the engagement element 25 is in the idle position it is unable to interact with the follower roller 20, so that the follower roller 20 can follow the rule of motion defined by the shape of the sliding guide 19, while when the engagement element 25 is in the working position it is capable of interacting with the follower roller 20, so as to modify its movement with respect to the one that would be imposed on the follower roller 20 by the shape of the sliding guide 19, and generating, for the follower roller 20, a rule of motion produced by the interaction between the follower roller 20 and the engagement element 25.

Advantageously, the sliding guide 19 comprises at least one track 26*a*, which can be engaged slidingly by the follower roller 20.

Conveniently, means for keeping the follower roller 20 in an engagement condition with said track 26*a* are provided which are constituted advantageously by elastic means 27, which will be better described hereinafter.

Preferably, the sliding guide 19 is constituted by a slot 28 formed on the side wall of a cylindrical drum 29, which is integral with the fixed structure 10*a* of the application station 10 and is mounted substantially coaxially to the axis of the output star conveyor 8.

The slot 28 runs around the axis of the cylindrical drum 29 according to a closed extension and is delimited by a pair of tracks 26*a* and 26*b*, respectively a first track or lower track 26*a* and a second track or upper track 26*b*, which are mutually opposite and mutually facing and between which the follower roller 20 is interposed.

Conveniently, the follower roller 20 is kept by the elastic means 27 in an engagement condition with the first track 26*a*, so that the rule of motion of the follower roller 20 can be determined by the shape of the first track 26*a*, at least when the engagement element 25 is in the idle position.

In greater detail, as shown for example in FIGS. 4, 10 and 11, the sliding guide 19 is advantageously structured so as to comprise at least one first movement portion 19*a*, which is contoured to impart to the follower roller 20 at least one first stroke between different heights which allows to produce, by virtue of the kinematic transmission means 21, the first oscillation movement on the part of the second pad 13*b*, during the movement of the application assembly 12, with respect to the fixed structure 10*a* of the application station 10.

In particular, the engagement element 25 is arranged substantially at the first movement portion 19*a* of the sliding guide 19 so that when the engagement element 25 is in the working position the follower roller 20 engages the engagement element 25 and not the first movement portion 19*a*.

Conveniently, the sliding guide 19 comprises, moreover, at least one first and at least one second parking portion 19*b* and 19*c*, which are arranged respectively upstream and downstream of the first movement portion 19*a*, along the direction of movement of the follower roller 20 along the sliding guide 19.

The first and second parking portions 19*b* and 19*c* each extends on a substantially horizontal plane arranged at a first height, so that the engagement of the parking portions 19*b* and 19*c* by the follower roller 20 forces the follower roller 20 to move while remaining at the first height, without performing strokes between different heights, thus maintaining the second pad 13b in a preset position during the movement of the application assembly 12 with respect to the fixed structure 10a of the application station 10.

In particular, when the engagement element 25 is in the working position it is slidingly engaged by the follower roller 20 instead of the first movement portion 19a and forms, for the follower roller 20, a path which extends on a substantially horizontal plane arranged at the first height, i.e., at the same height as the first and second parking portions 19b and 19c.

In this manner, when the engagement element 25 is in the working position, the follower roller 20, instead of following the path defined by the movement portion 19a, with consequent execution of the first oscillation movement by the second pad 13b, it continues its movement along the sliding guide 19, remaining at the same height imposed by the first and second parking portions 19b and 19c, with the result that the second pad 13b does not perform the first oscillation movement and remains in the position in which it is when the follower roller 20 moves along the first and second parking portions 19b, 19c.

In greater detail, as shown particularly in FIGS. 10 and 11, the first track 26a, i.e., the track against which the follower roller 20 is held in contact by the action of the elastic means 27, has, at the first parking portion 19b, a first planar portion 30a, which extends on a substantially horizontal plane located at the first height and, at the second parking portion 19c, a second planar portion 30b, which also extends on a substantially horizontal plane located at the first height.

The first track 26a instead comprises, at the first movement portion 19a, in mutual succession, along the direction of motion of the follower roller 20 along the sliding guide 19, a first descending inclined portion 31a and a first rising inclined portion 31b.

In particular, the first descending inclined portion 31a of the first track 26a protrudes from the first planar portion 30a and extends from the first height to a second height, lower than the first height, while the first rising inclined portion 31b extends in turn from the second height to the first height, connecting to the second planar portion 30b, as shown for example in FIG. 11.

The engagement element 25 forms a substantially planar sliding surface 25a, which, with the engagement element 25 in the working position, is slidingly engageable by the follower roller 20 and is arranged at the first height and so as to mutually connect the first planar portion 30a and the second planar portion 30b of the first track 26a, as can be seen in FIG. 10.

The sliding guide 19, downstream of the second parking portion 19c, along the advancement direction of the follower roller 20 along said sliding guide, has moreover at least one second movement portion 19d, by following which the follower roller 20 performs at least a second stroke between different heights which allows to produce, during the movement of the application assembly 12 with respect to the fixed structure 10a of the application station 10, the second oscillation movement on the part of the second pad 13b.

Advantageously, the second movement portion 19d of the sliding guide 19 comprises, in mutual succession, two parts, respectively a first part and a second part, between which a third parking portion 19e is interposed.

The first track 26a has, at the first part of the second movement portion 19d, a second descending inclined portion 31c, which protrudes from the second planar portion 30b and extends from the first height to a third height, which is lower than both the first height and the second height, while at the second part of the second movement portion 19d it has a second rising inclined portion 31d, which extends from the third height to the first height, blending with the first planar portion 30a.

The first track 26a has, at the third parking portion 19e, a third planar portion 30c that connects the terminal end of the second descending inclined portion 31c to the initial end of the second rising inclined portion 31d, extending on a substantially horizontal plane arranged at the third height.

Conveniently, the second track 26b extends substantially parallel to the first track 26a, in practice following its shape, except for the region arranged at the first movement portion 19a, where the second track 26b has advantageously a portion with a planar extension that extends parallel to the first planar portion 30a and to the second planar portion 30b of the first track 26a.

With reference again to the illustrated embodiment, the supporting structure 17 that supports the application assemblies 12 and the corresponding crimping devices 13 comprises an annular plate 32, which is axially fixed around an actuation shaft 33, which extends substantially vertically and rotates about its own axis.

The output star conveyor 8 is integrally keyed below the annular plate 32 around the actuation shaft 33.

As can be seen in the figures, the rotation axis 100 of the second pad 13b is conveniently oriented substantially at right angles to the axis of the output star conveyor 8 and therefore of the actuation shaft 33 and is arranged in a position that substantially passes through the vertical axis of the region designed to be occupied by the corresponding container 3 and by the corresponding retention head 5, so that the second pad 13b, by oscillating about its own rotation axis 100, can perform a movement around the upper part of the container 3 on which it is designed to operate.

More particularly, the second pad 13b is supported rotatably by the supporting structure 17 and more precisely by the annular plate 32 by means of an oscillation shaft 34, which defines, with its axis, the rotation axis 100 of the second pad 13b.

Conveniently, the oscillation shaft 34 is rotatably supported by a supporting block 35 rigidly fixed to the peripheral region of the annular plate 32.

Advantageously, the oscillation shaft 34 is connected to the second pad 13b by a lever element 36, which extends radially with respect to the oscillation shaft 34.

With this structure, the second pad 13b, during the movement of the corresponding application assembly 12 with respect to the fixed structure 10a of the application station 10, is capable of assuming at least two extreme positions which mutually angularly spaced around its rotation axis 100, and more precisely an idle or waiting position and an application position.

The second pad 13b is also capable of assuming a third position, interposed between these two extreme positions and constituted by a pick-up position in which it is angularly moved with respect to the idle position by an angle smaller than that with which it is angularly spaced from the idle position when it is in the application position.

In detail, in the idle position, the second pad 13b is arranged above the first pad 13a and is arranged so that its own working face is directed in the same direction as the working face of the first pad 13a.

The second pad 13b assumes the idle position at least when the corresponding container 3, once it has reached the output star conveyor 8, is taken by the corresponding application assembly 12, so that the second pad 13*b* can face, with its working face, the retention head 5 that still acts on the container 3.

The pick-up position is assumed by the second pad 13*b* when the container 3 on which it operates is taken by the output star conveyor 8 but is still on the carousel 6.

In the pick-up position, the second pad 13*b* is closer to the retention head 5 of the corresponding container 3, so that the second end 4*b* of the safety strip 4, which is applied on the retention head 5, contacts the working face of the second pad 13*b*, so as to be retained on the working face of the second pad 13*b* by virtue of the action of the suction port 14.

The application position is instead assumed by the second pad 13*b* after the corresponding container 3 has been moved away from the corresponding retention head 5.

In particular, in the application position the second pad 13*b* is rotated substantially through 180°, about its own rotation axis 100, with respect to the idle position, so that its working face is directed toward the working face of the first pad 13*a* and the second pad 13*b* is on the side of the corresponding container 3 that is opposite with respect to the side where the first pad 13*a* is located and so that its working face faces the second lateral portion 3*b* of the container 3, in order to thus be able to transfer the second end 4*b* of the safety strip 4 onto the second lateral portion 3*b* of the corresponding container 3.

In greater detail, by means of the first oscillation movement, the second pad 13*b* passes first from the idle position to the pick-up position, performing a rotation about its oscillation axis 100 in one direction, and then returns from the pick-up position to the idle position, performing a rotation about its oscillation axis 100 by the same angle as the previous one but in the opposite direction.

By virtue of the second oscillation movement, the second pad 13*b* instead passes from the idle position to the application position, performing a rotation about its oscillation axis 100 substantially of 180°, and, after remaining in the application position optionally for a preset time, returns from the application position to the idle position, performing in the opposite direction the rotation about its oscillation axis 100.

The second pad 13*b* performs, in sequence, the first oscillation movement and the second oscillation movement during the path of the corresponding container 3 on the output star conveyor 8.

More particularly, the second pad 13*b* performs the first oscillation movement when the corresponding container 3 is still engaged by the respective retention head 5 on the carousel 6, while it performs the second oscillation movement after the corresponding container 3 has been released from the engagement with the corresponding retention head 5 and has left the carousel 6.

In practice, as previously mentioned, the first oscillation movement consists of two successive rotation of the second pad 13*b* about its own oscillation axis 100, one in one direction and the other in the opposite direction, according to such a rotation angle as to allow the second pad 13*b* to pass, with the rotation in one direction, from the idle position, in which it is when the corresponding container 3 is received by the receptacle 8*a* of the output star conveyor 8 with which its application assembly 12 is associated, to the pick-up position, in which the second pad 13*b* is moved closer to the retention head 5 of the corresponding container 3, so that the working face of the second pad 13*b* can contact the second end 4*a* of the safety strip 4 that is applied on the retention head 5 that acts on the corresponding container 3 and retain it by virtue of the action of the suction port 14.

The rotation in the opposite direction of the first oscillation movement allows instead the second pad 13*b* to return to the idle position, so that the second end 4*b* of the safety strip 4, by remaining retained on the working face of the second pad 13*b*, by virtue of the action of the suction port 14, can be picked up by the second pad 13*b* and moved away, therefore, from the retention head 5 that acts on the corresponding container 3, before said container leaves the carousel 6 and is released from the engagement with the retention head 5.

The second oscillation movement performed by the second pad 13*b* consists, in turn, of two successive rotations, substantially through 180°, performed by the second pad 13*b*, one in one direction and the other in the opposite direction, about its rotation axis 100, after the corresponding container 3 has left the carousel 6.

In particular, in the second oscillation movement the second pad 13*b* passes, by rotating in one direction, from the idle position, in which the second pad 13*b* is, after the first oscillation movement, with the second end 4*b* of the safety strip 4 retained on its working face, to the application position, so that the second pad 13*b* can move the second end 4*b* of the safety strip 4 to adhere to the second lateral portion 3*b* of the container 3.

Also, in the second oscillation movement, by means of the rotation in the opposite direction, the second pad 13*b* returns, after the deactivation of the corresponding suction port 14, from the application position to the idle position, leaving the second end 4*b* of the safety strip 4 in adhesion on the second lateral portion 3*b* of the corresponding container 3, so as to be ready to operate on another container 3 that arrives from the carousel 6 in the corresponding receptacle 8*a* of the output star conveyor 8.

The rotation that returns, in the second oscillation movement, the second pad 13*b* from the application position to the idle position is advantageously performed by the second pad 13*b* after the second pad 13*b* has remained for a preset time in the application position, in order to ensure the correct adhesion of the second end 4*b* of the safety strip 4 to the second lateral portion 3*b* of the container 3.

Advantageously, the kinematic transmission means 21 that connect the second pad 13*b* to the corresponding follower roller 20, which engages slidingly the sliding guide 19, comprise a rack 37, with a substantially vertical axis, which is mounted so that it can translate along its axis, with respect to the supporting structure 17 and supports rotatably, at an upper end thereof, the follower roller 20.

In particular, the rack 37 engages with its teeth a pinion 38, which is fixed integrally in rotation about the axis of the oscillation shaft 34, so that the translational movements of the rack 37 along its own axis caused by the engagement of the follower roller 20 with the sliding guide 19 produce rotation movements of the oscillation shaft 34 about its axis.

Conveniently, the kinematic transmission means 21 and, more particularly, the rack 37 and the pinion 38 are arranged inside a box-like enclosure 21*a* fixed to the annular plate 32.

Advantageously, the elastic means 27 for keeping the follower roller 20 in a condition of engagement with the first track 26*a* are constituted by a pusher 39, which is supported by the supporting structure 17 and is designed to act on the second pad 13*b* and, more particularly, on the lever element 36 of the second pad 13*b*, at least when the second pad 13*b* is in an idle position.

In particular, the pusher 39 comprises a pusher pin 39*a* that can be engaged by the lever element 36, for example by means of a roller 40, which is rotatably associated with the lever element 36, when the lever element 36 is in the angular position that corresponds to the idle position of the second pad 13*b*.

More particularly, the pusher pin 39*a* is elastically loaded to exert on the lever element 36, when it is engaged by said lever element, an elastic action directed to produce the rotation of the lever element 36 in the direction that determines the downward translation of the rack 37 with consequent retention of the follower roller 20 against the first track 26*a*.

With this structure of the kinematic transmission means 21, when the follower roller 20 travels, during the movement of the corresponding application assembly 12, along the first planar portion 30*a* and the second planar portion 30*b*, the rack 37 remains in a stationary position with respect to the supporting structure 17 and the second pad 13*b* remains in the idle position.

With the engagement element 25 in an idle position, the transit of the follower roller 20 along the first movement portion 19*a* causes instead the first oscillation movement of the second pad 13*b*.

In particular, the passage of the follower roller 20 along the first descending inclined portion 31*a* of the first track 26*a* produces a translational motion of the rack 37 in one direction, and more precisely downward, and a consequent rotation of the oscillation shaft 34 that causes the transition of the second pad 13*b* from the idle position to the pick-up position.

The sliding of the follower roller 20 along the first rising inclined portion 31*b* instead causes the translational motion of the rack 37 in the other direction, i.e., upward, and the rotation in the reverse direction of the oscillation shaft 34, with consequent transition of the second pad 13*b* from the pick-up position to the idle position.

When instead the engagement element 25 is in the working position, the follower roller 20 travels along the sliding surface 25*a* formed by the engagement element 25, instead of along the first descending inclined portion 31*a* and the first rising inclined portion 31*b* which are formed on the first track 26*a*, so that the follower roller 20 maintains, in its motion along the sliding guide 19, the same height that it assumes when it travels along the first planar portion 30*a* and the second planar portion 30*b*, with the consequence that the second pad 13*b* is kept in the idle position and therefore is not moved to the pick-up position.

As also mentioned previously, when the follower roller 20 subsequently travels along the second movement portion 19*d* of the sliding guide 19, the second pad 13*b* performs the second oscillation movement, passing from the idle position to the application position, and then returns to the idle position.

In particular, while the follower roller 20 travels along the second descending inclined portion 31*c* of the first track 26*a*, the rack 37 performs a downward translational motion that leads to a rotation of the oscillation shaft 34 that causes the transition of the second pad 13*b* from the idle position to the application position.

Subsequently, when the follower roller 20 travels along the third planar portion 30*c*, it maintains the height reached at the end of the second descending inclined portion 31*c*, so that the second pad 13*b* remains in the application position, until the follower roller 20 ends its path along the third planar portion 30*c*.

Furthermore, when the follower roller 20 travels along the second rising inclined portion 31*d*, the rack 37 performs an upward translation that makes the oscillation shaft 34 rotate in the opposite direction with respect to the rotation performed during the passage of the follower roller 20 along the second descending inclined portion 31*c*, with the consequent return of the second pad 13*b* from the application position to the idle position.

It should be noted that the first pad 13*a* of the crimping device 13 of each application assembly 12 also is movable with respect to the supporting structure 17, during the movement of the corresponding application assembly 12 relative to the fixed structure 10*a* of the application station 10.

In particular, the first pad 13*a* of the crimping device 13 of each application assembly 12 is structured to perform a movement toward or away from the region designed to be occupied by the corresponding container 3, during the movement of the corresponding application assembly 12.

More particularly, the first pad 13*a* is connected to the free end of a first lever arm 41, which is mounted rotatably on the supporting structure 17, and more precisely on the annular plate 32, about a respective oscillation axis that is substantially parallel to the axis of the output star conveyor 8, so that the first pad 13*a* can pass from a retracted position, in which it is spaced from the region designed to be occupied by the corresponding container 3, so as to allow said container to enter and exit the respective receptacle 8*a* of the output star conveyor 8, to an advanced position, in which the first pad 13*a* is moved closer to the region designed to be occupied by the corresponding container 3, so as to be able to contact the first end 4*a* of the safety strip 4 applied to the first lateral portion 3*a* of the corresponding container 3 or to a portion of said safety strip that is proximate to its first end 4*a*, and vice versa.

The rotational actuation of the first lever arm 41, about the corresponding oscillation axis, for its movement between the retracted position and the advanced position, is provided by means of the sliding engagement of a first cam follower roller 42, arranged at the end of the first lever arm 41 that is opposite with respect to the one connected to the first pad 13*a*, with a first cam-like profile 43 formed on the fixed structure 10*a* of the application station 10 and shaped so as to impart to the first lever arm 41 a rotation in the direction that moves the first pad 13*a* from the advanced position to the retracted position, in contrast with first elastic return means, not shown, that act between the first lever arm 41 and the supporting structure 17, during the movement of the corresponding application assembly 12 about the axis of the output star conveyor 8.

Advantageously, the first pad 13*a* acts on the corresponding container 3 in cooperation with a respective abutment element 45, also comprised in the corresponding application assembly 12, which is in turn designed to be moved into engagement against the side of the container 3 that lies on the side opposite to the one on which the first pad 13*a* acts, so that the container 3 taken by each application assembly 12 can be clamped between the first pad 13*a* and the abutment element 45.

Conveniently, the abutment element 45 comprises a pad-like body 45*a* supported at the free end of a second lever arm 46, which in turn is supported, at its opposite end, by the supporting structure 17 and more particularly by the annular plate 32, about a corresponding oscillation axis which is substantially parallel to the axis of the output star conveyor 8.

In particular, the second lever arm 46 can be actuated rotationally about its own oscillation axis, in order to produce, in contrast with second elastic return means, also not shown, which act between the second lever arm 46 and the supporting structure 17, the movement of the corresponding pad-like body away from the respective container 3, due to the sliding engagement of a second cam follower roller 47, which is arranged at the end of the second lever arm 46 that is opposite to the end in which the abutment element 45 is present, with a second cam-like profile 48, also formed on the fixed structure 10*a* of the application station 10.

The suction port 14 of the second pad 13*b* of each application assembly 12 is advantageously in communication with a respective suction channel 50, which can be connected to the vacuum generator 15, integrally mounted to the fixed structure 10*a* of the application station 10.

In particular, as shown in FIG. 13, the vacuum generator 15 is connected to an outlet 51, which is formed in the vacuum distribution unit 16 and communicates with a suction slot 52, which extends parallel to a portion of the path of the application assemblies 12 around the axis of the output star conveyor 8 and is in turn formed on an upper face of the vacuum distribution unit 16.

More particularly, the suction channel 50 of each application assembly 12 has, at its end opposite to the one connected to the suction port 14 of the corresponding second pad 13*b*, a communication port 53, which during the passage of the corresponding application assembly 12 at the region of the vacuum distribution unit 16 in which the suction slot 52 is formed, during the movement of the corresponding application assembly 12 about the axis of the output star conveyor 8, is designed to come into communication with the suction slot 52, so as to connect the suction port 14 of the corresponding second pad 13*b* to the vacuum generator 15, through the outlet 51 of the vacuum distribution unit 16, thus creating a suction of air through the suction port 14 of the corresponding second pad 13*b*.

Conveniently, the suction channel 50 of each application assembly 12 has at least one connection portion 54 that extends along the axis of the corresponding oscillation shaft 34 and is connected, at one end, by means of a first rotary joint 55, to a first air suction duct 56, connected to the communication port 53, and, at the other end, by means of a second rotary joint 57, to a second air suction duct 58, constituted conveniently by a flexible hose and connected, by means of a connector 59, to the suction port 14 of the corresponding second pad 13*b*.

It should be noted that conveniently the communication ports 53 of the application assemblies 12 are formed in a movable distribution unit 60, which is integrally connected to the annular plate 32 and face, with one of its faces, the vacuum distribution unit 16.

In particular, the communication ports 53 are formed on a face of the movable distribution unit 60 that faces the face of the vacuum distribution unit 16 on which the suction slot 52 is formed.

The first air suction ducts 56 of the application assemblies 12 are connected to the movable distribution unit 60 by means of connectors 61, each of which communicates, inside the movable distribution unit 60, with the corresponding communication port 53.

In particular, the movable distribution unit 60 is arranged below the annular plate 32 and through openings 62 are provided in the annular plate 32, at the application assemblies 12, and are crossed by the air suction ducts 56.

The engagement element 25 is constituted conveniently by a substantially plate-shaped body which is arranged, at least with the portion thereof that defines the sliding surface 25*a*, in a recess or hollow 63 that is shaped correspondingly and is formed on the lateral surface of the side wall of the cylindrical drum 29, particularly in the region of the track 26*a* arranged at the first movement portion 19*a* of the sliding guide 19.

The recess 63 constitutes, in practice, a reduction of the transverse dimension of the first track 26*a* at the first movement portion 19*a* of the sliding guide 19.

The movement of the engagement element 25 between the working position and the idle position is provided by means of an actuation cylinder 64, supported by the cylindrical drum 29 and supplied by a fluid-operated actuation assembly 65.

The actuation cylinder 64 is connected with its stem 64*a* to the engagement element 25 preferably by means of a linkage 66, which is articulated at one end to the stem 64*a* of the actuation cylinder 64 and at the other end to the engagement element 25.

The operation of the machine, according to the invention, is as follows.

Starting from a situation in which the engagement element 25 is in the idle position, the carousel 6, at its entry region, is fed with the containers 3, which are each received by a respective supporting plate 7, on which they are kept in resting contact by a corresponding retention head 5, so as to be moved by the carousel along their advancement path.

When a container 3 arranged on a supporting plate 7 of the carousel 6 and engaged in an upper region by a respective retention head 5 arrives at the transfer station 9, it receives from the transfer drum 11 a respective safety strip 4 which is arranged substantially vertically.

In particular, the safety strip 4 transferred by the transfer drum 11 adheres, with its first end 4*a*, located in a lower region, to a first lateral portion 3*a* of the container 3, while its second end, located in an upper region, adheres to the retention head 5 that acts on the corresponding container 3.

At this point, the control means 22 verify, by virtue of the detection means 23, that the safety strip 4 is applied on the container 3 in output from the transfer station 9 and on the corresponding retention head 5.

If the detection means 22 detect the presence of the safety strip 4 applied on the container 3 in output from the transfer station 9 and on the corresponding retention head 5, the control means 22 do not intervene and the engagement element 25 remains in the idle position.

The container 3 that has received the safety strip 4 at the transfer station 9 then reaches, being entrained by the carousel 6, the application station 10, where it is received by a receptacle 8*a* of the output star conveyor 8 and where it is taken by a respective application assembly 12, which has the first pad 13*a* in the retracted position and the second pad 13*b* in the idle position.

The rotational actuation of the output star conveyor 8 by the actuation shaft 33 produces the rotation about the axis of the output star conveyor 8 of the annular plate 32 as well, and consequently causes the movement of the application assemblies 12 with respect to the fixed structure 10*a* of the application station 10 and the sliding of the corresponding follower rollers 20 along the sliding guide 19 of the cam-based actuation device 18.

In particular, while the respective application assembly 12 follows the container 3 that has reached the application station 10 in the portion of its advancement path defined by the output star conveyor 8, the first pad 13*a* and the abutment element 45 are moved into engagement, on mutually opposite sides, against the container 3, so as to clamp the container 3 between the first pad 13*a* and the abutment element 45.

It should be noted that before the arrival of the container 3 at the application station 10, the supporting plate 7 of the container 3 can be actuated rotationally in order to ensure that the container 3 is oriented so that the first lateral portion 3*a* of the container 3 is directed toward the first pad 13*a*, so that the first pad 13*a*, once brought against the container 3, can hold the first end 4*a* of the safety strip 4 against the container 3.

The rotation of the supporting plate 7 is furthermore useful to ensure that the detection means 23 can verify the presence of the safety strip 4 on the container 3.

At this point, the application assembly 12 that acts on the container 3 passes at the region of the vacuum distribution unit 16 in which the suction slot 52 is present, so that its communication port 53 and consequently also the suction port 14 of the corresponding second pad 13*b* are connected to the vacuum generator 15, causing therefore the activation of the suction port 14 and the consequent suction of air from outside through the suction port 14.

At the same time, the follower roller 20 travels along the first descending inclined portion 31*a* and subsequently along the first rising inclined portion 31*b* of the first track 26*a* of the sliding guide 19, with the result that the second pad 13*b* performs the first oscillation movement, about its rotation axis 100, passing from the idle position to the pick-up position, in which it is moved closer to the second end 4*b* of the safety strip 4 which is on the retention head 5 acting on the corresponding container 3, and then returning from the pick-up position to the idle position with the second end 4*b* of the safety strip 4 retained on its working face by virtue of the retaining action applied by the corresponding suction port 14, so as to pick up the second end 4*b* of the safety strip 4 from the retention head 5 that acts on the corresponding container 3.

Subsequently, the retention head 5 passes from the operational condition to the inoperative condition and the container 3, continuing in its movement on the output star conveyor 8, is progressively moved away from the carousel 6 and, therefore, from the corresponding retention head 5.

At this point, the follower roller 20 reaches the second descending inclined portion 31*c*, so as to produce the transition of the second pad 13*b* from the idle position to the application position.

Subsequently, the second pad 13*b* maintains the reached application position as long as the follower roller 20 travels along the third planar portion 30*c*, so as to ensure the adhesion of the second end 4*b* of the safety strip 4 to the second lateral portion 3*b* of the container 3.

In the meantime, the application assembly 12, continuing in its movement with respect to the fixed structure 10*a* of the application station 10, moves beyond the region of the vacuum distribution unit 16 that is affected by the suction slot 52, and therefore the communication between the vacuum generator 15 and the communication port 53 of the application assembly 12 is interrupted.

As a consequence, since the suction port 14 is no longer connected to the vacuum generator 15, it stops applying a retention action on the second end 4*b* of the safety strip 4.

Subsequently, the follower roller 20 travels along the second rising inclined portion 31*d*, with the consequent transition of the second pad 13*b* from the application position to the idle position.

At this point, the container 3 with the safety strip 4 applied on its upper part leaves the output star conveyor 8 to be sent to other optional processes.

If instead the control means 22 detect, by virtue of the detection means 23, the absence of the safety strip 4 on a container 3 in output from the transfer station 9, due for example to the depletion of the safety strips 4 in the magazine of the transfer station 9 and to the consequent lack of transfer thereof by the transfer station 9, the control means 22 command the activation of the actuation cylinder 64, in order to move the engagement element 25 from the idle position to the working portion.

In this manner, once the container 3 lacking the safety strip 4 has been taken by a respective application assembly 12, the follower roller 20, instead of traveling along the first descending inclined portion 31*a* and the second rising inclined portion 31*b* of the first track 26*a* of the sliding guide 19, slides along the sliding surface 25*a* of the engagement element 25, thus remaining at the height of the parking portions 19*b* and 19*c*, so that the second pad 13*b* remains in the idle position and does not perform the first oscillation movement.

Once the engagement element 25 has been passed, the follower roller 20 continues its path along the sliding guide 19 as in the previous case and then travels along the second movement portion 19*d*, resulting in the execution, by the second pad 13*b*, of the second oscillation movement, without this causing any problem, since the second oscillation movement occurs after the container 3 has left the carousel 6 and has been moved away from the retention head 5 that was acting on it.

When the control means 22 detect the first container 3 in output from the transfer station 9 with the safety strip 4 applied after the last one found to be lacking it, the control means 22 command the activation of the actuation cylinder 64 in order to move the engagement element 25 from the working position to the idle position, so that when the first container 3 with the safety strip 4 applied arrives at the application station 10, the second pad 13*b* of the application assembly 12 that takes it can perform the first oscillation movement.

In practice it has been found that the invention achieves the intended aim and objects and in particular the fact is stressed that the machine according to the invention allows to prevent, in case of lack of transfer of the safety strips by the transfer station, the second pad from being still able to touch, with the risk of getting soiled with glue, the retention heads that act on the containers to which the respective safety strip has not been transferred by the transfer station.

The invention thus conceived is susceptible of numerous modifications and variations, all of which are within the scope of the appended claims; all the details may furthermore be replaced with other technically equivalent elements.

In practice, the materials used, as well as the contingent shapes and dimensions, may be any according to the requirements and the state of the art.

The disclosures in Italian Patent Application No. 102022000001625 from which this application claims priority are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A machine for applying safety strips to the upper part of containers, comprising means for conveying the containers along an advancement path, said means for conveying having retention heads, each retention head configured for acting on an upper region of a respective one of the containers, along said advancement path there being in mutual succession at least one transfer station, adapted to transfer to an upper part of the containers a respective safety strip arranged substantially vertically and with a first end thereof, located in a lower region, applied to a first lateral portion of a corresponding container and a second end thereof, located in an upper region, applied to the retention head that acts on the corresponding container, and at least one application station which comprises a fixed structure which supports at least one application assembly which can move, with respect to said fixed structure, substantially parallel to at least one portion of said advancement path of the containers and in a manner which is synchronized with the movement of the containers on said conveyance means, in order to follow a respective container, said at least one application assembly having at least one crimping device which comprises a first pad, designed to contact, with a working face thereof, the first end of the safety strip applied to the corresponding container, and a second pad, which is provided, on a working face thereof, with suction means for a removable retention of the safety strip and is configured to move so as to oscillate with respect to said first pad about a rotation axis which is axially offset with respect to an axis of said second pad, said second pad being functionally connected to a cam-based actuation device which is shaped to impart in sequence to said second pad, in response to a movement of said application assembly, at least one first oscillation movement about said rotation axis, in order to allow said second pad to remove from the retention head that acts on the corresponding container the second end of the safety strip, retaining it on a working face thereof, by virtue of said suction means, and at least one second oscillation movement, about said rotation axis, in order to allow said second pad to move the second end of the safety strip so that the second adheres to a second lateral portion of the corresponding container, which is arranged on the side opposite to said first lateral portion, further comprising control means which are provided with means for detecting a transfer by said transfer station of the safety strips onto the containers that arrive on the conveyance means and onto the corresponding retention heads and means for varying a shape of at least a portion of a sliding guide of said cam-based actuation device and which are functionally connected to said control means and can be activated on command by said control means upon detection, by said detection means, of a lack of transfer of the safety strip to at least one corresponding container by said transfer station, in order to inhibit execution of said first oscillation movement by said second pad in the absence of the safety strip on the corresponding container.

2. The machine according to claim 1, wherein said cam-based actuation device comprises said sliding guide which is integral with said fixed structure of said application station, said at least one application assembly comprising at least one respective follower roller which engages slidingly said sliding guide and is connected, by virtue of kinematic transmission means, to said second pad, in order to impart to said second pad said at least one first oscillation movement and said second oscillation movement in response to the movement of said at least one application assembly relative to said fixed structure of said application station, said means for varying the shape of at least a portion of the sliding guide of said cam-based actuation device comprising at least one engagement element, which can be moved on command, following an intervention of said control means, between an idle position, in which it does not interact with said at least one follower roller, and a working position, assumed following the detection by said detection means of the lack of transfer of the safety strip to at least one corresponding container, in which it is adapted to interact with said at least one follower roller in order to modify the movement imposed on said follower roller by said sliding guide.

3. The machine according to claim 2, wherein said sliding guide comprises at least one track which can be engaged slidingly by said follower roller, means being provided for retaining said at least one follower roller in the condition of engagement with said at least one track.

4. The machine according to claim 2, wherein said sliding guide comprises at least one first movement portion which is contoured in order to impart to said follower roller at least one first stroke between different heights which is adapted to produce said first oscillation movement on the part of said second pad, during the movement of said at least one application assembly, with respect to said fixed structure of said application station, said engagement element in said working position being engageable by said follower roller in order to prevent the execution of said at least one first stroke by said follower roller.

5. The machine according to claim 4, wherein said sliding guide comprises at least one first parking portion and at least one second parking portion which are arranged respectively upstream and downstream of said first movement portion, along the direction of movement of said follower roller along said sliding guide, each being extended on a substantially horizontal plane arranged at a first height, the engagement of said first parking portion and of said second parking portion by said follower roller producing the retention of said second pad in a preset position during the movement of said at least one application assembly, with respect to the fixed structure of said application station, said at least one engagement element in said working position being slidingly engageable by said follower roller, instead of said first movement portion, and forming, for said follower roller, a path which extends on a substantially horizontal plane arranged at said first height.

6. The machine according to claim 5, wherein said track has, at said first parking portion, a first planar portion, which extends on a substantially horizontal plane located at said first height and, at said second parking portion, a second planar portion, which extends on a substantially horizontal plane located at said first height, said first movement portion comprising, in mutual succession, along the direction of movement of said follower roller along said sliding guide, a first descending inclined portion, which extends from said first height to a second height, which is lower than said first height, and a first rising inclined portion, which extends from said second height to said first height, said at least one engagement element defining a substantially planar sliding surface, said sliding surface, with said at least one engagement element in said working position, being engageable slidingly by said follower roller and being arranged at said first height and so as to mutually connect said first planar portion to said second planar portion.

* * * * *